US012563562B2

(12) United States Patent
Babaei

(10) Patent No.: US 12,563,562 B2
(45) Date of Patent: Feb. 24, 2026

(54) WIRELESS DEVICE PROCESSES BASED ON SURVIVAL TIME STATE

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 529 days.

(21) Appl. No.: 17/967,990

(22) Filed: Oct. 18, 2022

(65) Prior Publication Data

US 2023/0124521 A1 Apr. 20, 2023

Related U.S. Application Data

(60) Provisional application No. 63/270,009, filed on Oct. 20, 2021.

(51) Int. Cl.
| | |
|---|---|
| *H04W 72/23* | (2023.01) |
| *H04L 1/08* | (2006.01) |
| *H04W 72/1263* | (2023.01) |
| *H04W 72/20* | (2023.01) |
| *H04W 80/02* | (2009.01) |

(52) U.S. Cl.
CPC ............... *H04W 72/23* (2023.01); *H04L 1/08* (2013.01); *H04W 72/1263* (2013.01); *H04W 72/20* (2023.01); *H04W 80/02* (2013.01)

(58) Field of Classification Search
CPC ...... H04W 72/23; H04W 72/1263; H04L 1/08
See application file for complete search history.

(56) References Cited

U.S. PATENT DOCUMENTS

| | | | | |
|---|---|---|---|---|
| 2015/0327236 A1* | 11/2015 | Lin | .......................... | H04L 47/34 |
| | | | | 370/329 |
| 2020/0404743 A1* | 12/2020 | Baek | ...................... | H04W 76/27 |
| 2023/0041119 A1* | 2/2023 | Chin | ......................... | H04L 1/08 |
| 2023/0309180 A1* | 9/2023 | Tesanovic | ............. | H04W 76/25 |

OTHER PUBLICATIONS

3GPP TS 38.211 V16.7.0 (Sep. 2021); Technical Specification; 3rd Generation Partnership Project; Technical Specification Group Radio Access Network; NR; Physical channels and modulation; (Release 16).
3GPP TS 38.212 V16.7.0 (Sep. 2021); Technical Specification; 3rd Generation Partnership Project; Technical Specification Group Radio Access Network; NR; Multiplexing and channel coding; (Release 16).

(Continued)

*Primary Examiner* — Benjamin H Elliott, IV
*Assistant Examiner* — Tracy Lauren Raimondo
(74) *Attorney, Agent, or Firm* — Alireza Babaei

(57) ABSTRACT

A wireless device may receive a configuration parameter indicating that a survival time state is configured for a first radio bearer. The wireless device may determine to enter a survival time state for the first radio bearer in response to receiving a retransmission grant for a transport block comprising data of a logical channel associated with the first radio bearer. In response to receiving control information, the wireless device may determine to exit from the survival time state for the first radio bearer and remain in the survival time state for a second radio bearer.

20 Claims, 33 Drawing Sheets

(56)                    References Cited

OTHER PUBLICATIONS

3GPP TS 38.213 V16.7.0 (Sep. 2021); Technical Specification; 3rd Generation Partnership Project; Technical Specification Group Radio Access Network; NR; Physical layer procedures for control; (Release 16).

3GPP TS 38.214 V16.7.0 (Sep. 2021); Technical Specification; 3rd Generation Partnership Project; Technical Specification Group Radio Access Network; NR; Physical layer procedures for data; (Release 16).

3GPP TS 38.300 V16.7.0 (Sep. 2021); Technical Specification; 3rd Generation Partnership Project; Technical Specification Group Radio Access Network; NR; NR and NG-RAN Overall Description; Stage 2; (Release 16).

3GPP TS 38.321 V16.6.0 (Sep. 2021); Technical Specification; 3rd Generation Partnership Project; Technical Specification Group Radio Access Network; NR; Medium Access Control (MAC) protocol specification; (Release 16).

3GPP TS 38.331 V16.6.0 (Sep. 2021); Technical Specification; 3rd Generation Partnership Project; Technical Specification Group Radio Access Network; NR; Radio Resource Control (RRC); Protocol specification; (Release 16).

3GPP TSG-RAN WG2 Meeting #114-e; R2-2104900; Online, May 19-May 27, 2021; Source: CATT; Title: Comparison of the solutions for Survival Time; Agenda Item: 8.5.4; Document for: Discussion and Decision.

3GPP TSG-RAN WG2 Meeting #114e; R2-2104903; Electronic, May 19-27, 2021; Agenda item: 8.5.4; Source: Qualcomm Incorporated; Title: RAN Enhancements to Support New QoS; WID: NR_IIOT_URLLC_enh; Document for: Discussion and Decision.

3GPP TSG-RAN WG2 Meeting #114bis; electronic R2-2104980; Update of R2-2103196; Online, May 19-May 27, 2021; Agenda Item: 8.5.4 (RAN enhancements based on new QoS); Source: Fujitsu; Title: Topics on new QoS handling; Document for. Decision.

3GPP TSG-RAN WG2 Meeting #114-e; R2-2105114; e-Meeting, May 19-May 27, 2021; Agenda item: 8.5.4; Source: Apple; Title: Reliability enhancements for CG/SPS; Document for: Discussion / Decision.

3GPP TSG-RAN WG2 Meeting #114-e; R2-2105115; e-Meeting, May 19-May 27, 2021; Agenda item: 8.5.4; Source: Apple; Title: Further considerations on survival time for new Qos; Document for: Discussion / Decision.

3GPP TSG-RAN WG2 Meeting #114 E-meeting; R2-2105312; Online, May 19-May 27, 2021; Source: ZTE Corporation, Sanechips, China Southern Power Grid Co., Ltd; Title: Further discussion on enhanced QoS; Agenda Item: 8.5.4; Document for: Discussion and Decision.

3GPP TSG-RAN WG2 Meeting #114 electronic; R2-2105419; Online, May 19-May 27, 2021; Agenda item: 8.5.4; Source: III; Title: Further discussion on RAN enhancements based on Survival Time; Document for: Discussion and Decision.

3GPP TSG-RAN WG2 Meeting #114 electronic; R2-2105457; E-meeting, May 19-27, 2021; Agenda item: 8.5.4; Source: Lenovo, Motorola Mobility; Title: Discussion on the mechanism to guarantee the survival time; Document for: Discussion and Decision.

3GPP TSG-RAN WG2 #114-e; R2-2105567; E-meeting, May 2021; Agenda Item: 8.5.4; Source: OPPO; Title: Consideration on RAN enhancement based on new QoS; Document for: Discussion, Decision.

3GPP TSG-RAN WG2 #114-e; R2-2105638; E-meeting, May 19-27, 2021; Agenda item: 8.5.4; Source: Samsung; Title: Entering and operating in the Survival Time state; Document for: Discussion and decision.

3GPP TSG-RAN WG2 Meeting #114 electronic; R2-2105725; E-Meeting, May 19-May 27, 2021; revision of R2-2104225; Source: Xiaomi Communications; Title: Clarification on the survival time; Agenda Item: 8.5.4; Document for. Discussion and Decision.

3GPP TSG-RAN WG2 Meeting #114 Electronic; R2-2105873; Elbonia, May 19-27, 2021; R2-2102993; Agenda item: 8.5.4; Source: Nokia, Nokia Shanghai Bell; Title: RAN Enhancement for New QoS Parameters; WID/SID: NR_IIOT_URLLC_enh—Release 17; Document for: Discussion and Decision.

3GPP TSG-RAN WG2 Meeting #114-e; R2-2105954; Electronic Meeting, May 19-May 27, 2021; Agenda item: 8.5.4; Source: Futurewei; Title: Discussion on the roles played in the survival time operation; Document for: Discussion.

3GPP TSG-RAN WG2 Meeting #114-e; R2-2106041; Online, May 19-27, 2021; Agenda item: 8.5.4; Source: Huawei, HiSilicon; Title: Discussion on multi-level PERs for survival time handling; Document for: Discussion and Decision.

3GPP RAN WG2 Meeting #114-e; R2-2106044; eMeeting, May 19-May 27, 2021; Agenda Item: 8.5.4; Source: InterDigital; Title: Enhancements based on new QoS requirements; Document for: Discussion, Decision.

3GPP TSG RAN WG2 Meeting #114-e; R2-2106066; e-Meeting, May 19-27, 2021; Agenda item: 8.5.4; Source: Intel Corporation; Title: RAN2 Enhancements to Support Survival Time; Document for: Discussion.

3GPP TSG-RAN WG2 # 114 electronic; R2-2106227; Online, May 19-May 27, 2021; revision of R2-2103689; Agenda Item: 8.5.4; Source: CMCC; Title: Discussion on the RAN support for new QoS parameters; WID/SID: NR_IIOT_URLLC_enh; Document for: Discussion and Decision.

3GPP TSG-RAN WG2 #114-e; R2-2106328; Electronic meeting, May 19-May 27, 2021; Agenda Item: 8.5.4; Source: TCL Communications Ltd.; Title: Discussion of RAN enhancements based on new QoS; Document for: Discussion and Decision.

3GPP TSG-RAN WG2 Meeting #114 electronic; R2- 2106397; Online, May 19-27, 2021; Title Enhancement for survival time; Source LG Electronics; Document for Discussion and Decision; Agenda Item 8.5.4; WID/SID NR_IIOT_URLLC_enh-Core.

3GPP TSG-RAN WG2 #114e Tdoc; R2-2106413; Electronic meeting, May 19, 2021-May 27, 2021; Agenda Item: 8.5.4; Source: Ericsson; Title: RAN enhancements based on new QoS related parameters; Document for: Discussion, Decision.

3GPP TSG-RAN WG2 Meeting #115-e; R2-2107154; Online, Aug. 9-27, 2021; Revision of R2-2106041; Agenda item: 8.5.4; Source: Huawei, HiSilicon; Title: Discussion on multi-level PERs for survival time handling; Document for: Discussion and Decision.

3GPP TSG-RAN WG2 #115-e; R2-2107174; E-meeting, Aug. 16-27, 2021; revision of R2-2105638; Agenda item: 8.5.4; Source: Samsung; Title: Entering, operating in, and exiting the Survival Time state; Document for: Discussion and decision.

3GPP TSG-RAN WG2 Meeting #115-e; R2-2107203; Online, Aug. 16-Aug. 27, 2021; Source: CATT; Title: UE-based reactive solution for survival time; Agenda Item: 8.5.4; Document for: Discussion and Decision.

3GPP TSG-RAN WG2 Meeting #115e; R2-2107558; Electronic, Aug. 9-27, 2021; Agenda item: 8.5.4; Source: Qualcomm Incorporated; Title: RAN Enhancements to Support Survival Time QoS; WID: NR_IIOT_URLLC_enh; Document for: Discussion and Decision.

3GPP TSG-RAN WG2 Meeting #115-e; R2-2107611; e-Meeting, Aug. 9-Aug. 27, 2021; Agenda item: 8.5.4; Source: Apple; Title: Reliability enhancements for CG/SPS; Document for: Discussion / Decision.

3GPP TSG-RAN WG2 Meeting #115-e; R2-2107612; e-Meeting, Aug. 9-Aug. 27, 2021; Agenda item: 8.5.4; Source: Apple; Title: Further considerations on survival time for new QoS; Document for: Discussion / Decision.

3GPP TSG-RAN WG2 Meeting #115 electronic; R2-2107658; Online, Aug. 16-Aug. 27, 2021; Agenda Item: 8.5.4 (RAN enhancements based on new QoS); Source: Fujitsu; Title: L1/L2 configuration adaptation; Document for: Decision.

3GPP TSG-RAN WG2 #115-e; R2-2107738; E-meeting, Aug. 2021; Agenda Item: 8.5.4; Source: OPPO; Title: Consideration on RAN enhancement based on new QoS; Document for: Discussion, Decision.

3GPP TSG-RAN WG2 Meeting #115 e-meeting; R2-2107742; Online, Aug. 9-Aug. 27, 2021; Source: ZTE Corporation, Sanechips,

(56) References Cited

OTHER PUBLICATIONS

China Southern Power Grid Co., Ltd; Title: Remaining issues on enhanced QoS; Agenda Item: 8.5.4; Document for: Discussion and Decision.

3GPP TSG-RAN WG2 Meeting #115 electronic; R2-2107802; E-Meeting, Aug. 9-27, 2021; Source: vivo; Title: Consideration on reactive solution for supporting survival time; Agenda Item: 8.5.4; Document for: Discussion and Decision.

3GPP TSG-RAN WG2 Meeting #115 electronic; R2-2107806; Online, Aug. 9-Aug. 27, 2021; Agenda item: 8.5.4; Source: III; Title: Further discussions on RAN enhancements based on Survival Time; Document for: Discussion and Decision.

3GPP TSG-RAN WG2 Meeting #115 electronic; R2-2107895; E-meeting, Aug. 9-27, 2021; Agenda item: 8.5.4; Source: Lenovo, Motorola Mobility; Title: Discussion on the mechanism to guarantee the survival time; Document for: Discussion and Decision.

3GPP TSG-RAN WG2 Meeting #115 Electronic; R2-2108023; Elbonia, Aug. 9-27, 2021; Agenda item: 8.5.4; Source: Nokia, Nokia Shanghai Bell; Title: Analysis of Potential RAN Enhancements for Survival Time; WID/SID: NR_IIOT_URLLC_enh—Release 17; Document for: Discussion and Decision.

3GPP TSG-RAN WG2 #115e; Tdoc R2-2108099; Electronic meeting, Aug. 9, 2021-Aug. 27, 2021; Agenda Item: 8.5.4; Source: Ericsson; Title: RAN enhancements based on new QoS related parameters; Document for: Discussion, Decision.

3GPP TSG-RAN WG2 Meeting #115-e; R2-2108169; Online, Aug. 16-27, 2021; Agenda item: 8.5.4; Source: China Telecom; Title: Discussion on RAN enhancement to support new QoS; Document for: Discussion and Decision.

3GPP TSG RAN WG2 Meeting #115-e; R2-2108435; e-Meeting, Aug. 9-27, 2021; Agenda item: 8.5.4; Source: Intel Corporation; Title: UE-based Survival time handling; Document for: Discussion.

3GPP TSG-RAN WG2 Meeting #115-e; R2-2108457; Elbonia, Aug. 9-27, 2021; Agenda item: 8.5.4; Source: Sequans Communications; Title: ST handling with alternating CC allocations; Document for: Discussion and Decision.

3GPP TSG-RAN WG2 Meeting #115-e; R2-2108459; Electronic Meeting, Aug. 16-Aug. 27, 2021; Agenda item: 8.5.4; Source: Futurewei; Title: Discussion on avoiding prematurely entering Survival Time state; Document for: Discussion and Decision.

3GPP TSG-RAN WG2 # 115 electronic; R2-2108516; Online, Aug. 2021; Agenda Item: 8.5.4; Source: CMCC; Title: Discussion on the RAN support for new QoS parameters; WID/SID: NR_IIOT_URLLC_enh; Document for: Discussion and Decision.

3GPP RAN WG2 Meeting #115-e; R2-2108666; eMeeting, Aug. 16-27, 2021; Agenda Item: 8.5.4; Source: InterDigital; Title: Enhancements based on new QoS requirements; Document for: Discussion, Decision.

3GPP TSG-RAN WG2 Meeting #115 electronic; R2- 2108786; Online, Aug. 16-27, 2021; Title Progress of QoS support; Source LG Electronics; Document for Discussion and Decision; Agenda Item 8.5.4; WID/SID; NR_IIOT_URLLC_enh-Core.

3GPP TSG-RAN WG2 Meeting #115 electronic; R2-2108795; E-Meeting, Aug. 9-Aug. 27, 2021; revision of R2-2105725; Source: Xiaomi Communications; Title: Clarification on the survival time requirement; Agenda Item: 8.5.4; Document for: Discussion and Decision.

* cited by examiner

| R | F | LCID | Oct 1 |
|---|---|------|-------|
| L | | | Oct 2 |

| R | F | LCID | Oct 1 |
|---|---|------|-------|
| eLCID | | | Oct 2 |
| L | | | Oct 3 |

| R | F | LCID | Oct 1 |
|---|---|------|-------|
| eLCID | | | Oct 2 |
| eLCID | | | Oct 3 |
| L | | | Oct 4 |

FIG. 16

Figure 32:
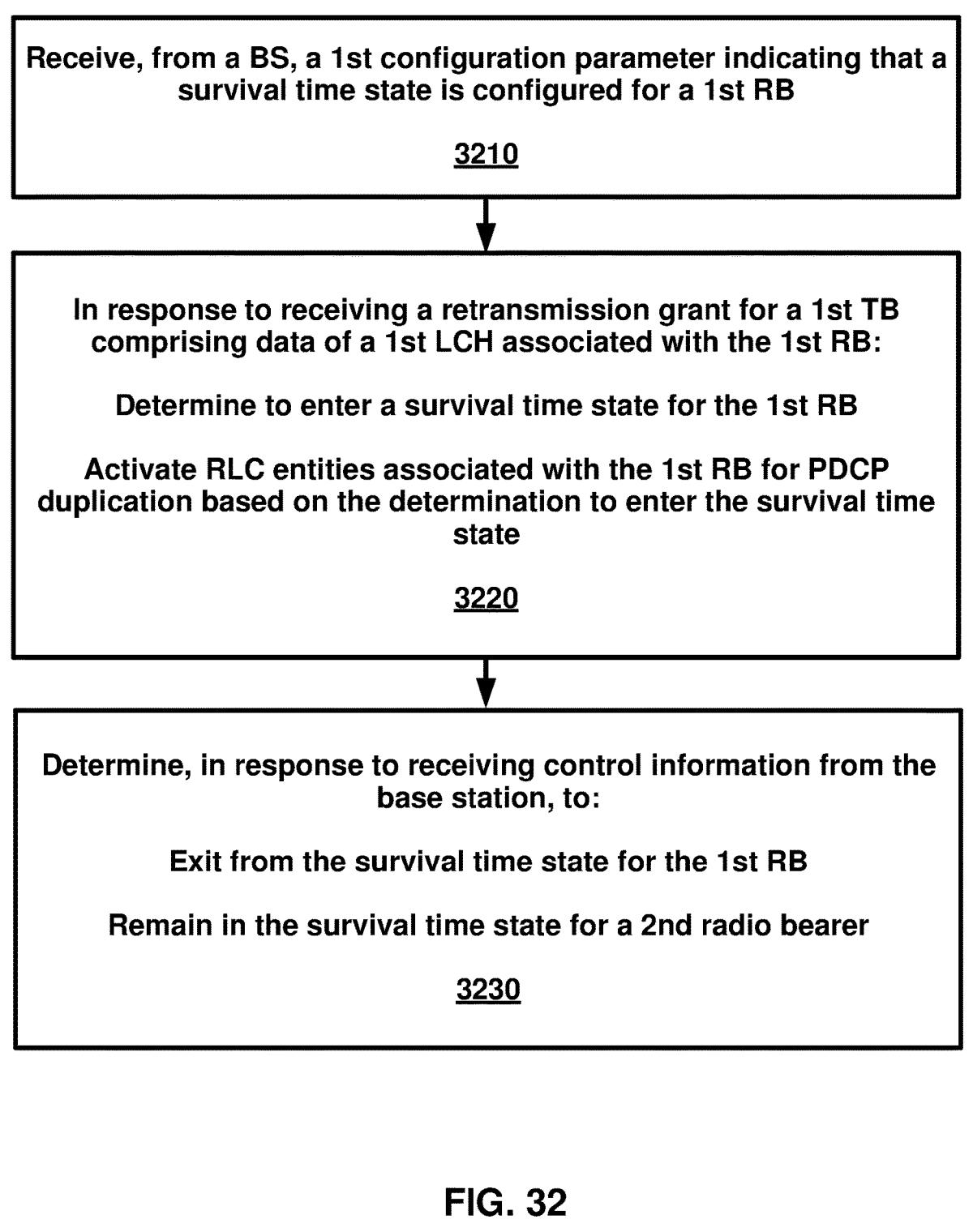

Receive, from a BS, a 1st configuration parameter indicating that a survival time state is configured for a 1st RB

3210

In response to receiving a retransmission grant for a 1st TB comprising data of a 1st LCH associated with the 1st RB:

Determine to enter a survival time state for the 1st RB

Activate RLC entities associated with the 1st RB for PDCP duplication based on the determination to enter the survival time state

3220

Determine, in response to receiving control information from the base station, to:

Exit from the survival time state for the 1st RB

Remain in the survival time state for a 2nd radio bearer

Figure 33:
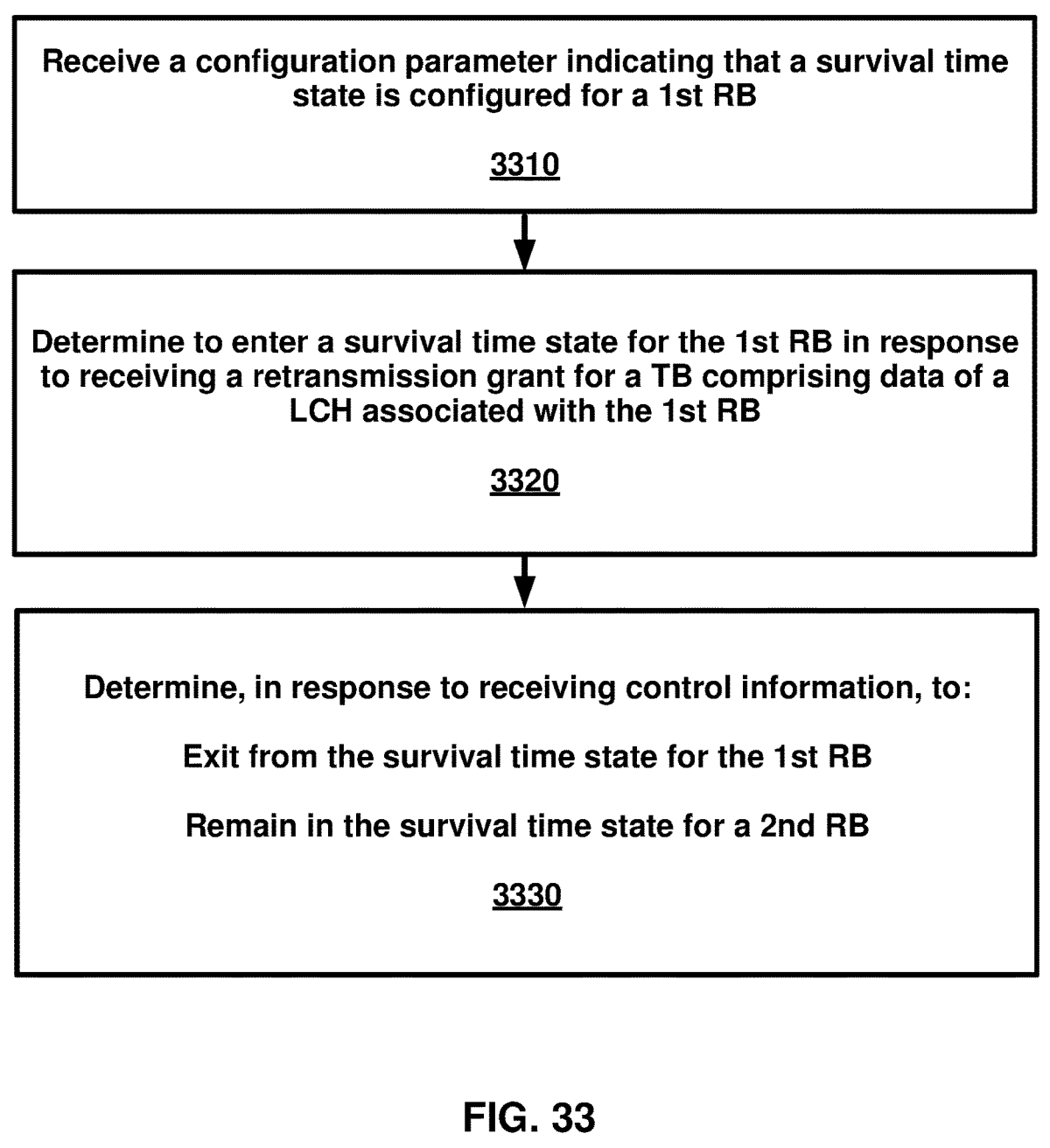

Receive a configuration parameter indicating that a survival time state is configured for a 1st RB

3310

Determine to enter a survival time state for the 1st RB in response to receiving a retransmission grant for a TB comprising data of a LCH associated with the 1st RB

3320

Determine, in response to receiving control information, to:

Exit from the survival time state for the 1st RB

Remain in the survival time state for a 2nd RB

WIRELESS DEVICE PROCESSES BASED ON SURVIVAL TIME STATE

CROSS-REFERENCE TO RELATED APPLICATIONS

This application claims the benefit of U.S. Provisional Application No. 63/270,009, filed Oct. 20, 2021, which is hereby incorporated by reference in its entirety.

BRIEF DESCRIPTION OF THE DRAWINGS

FIG. 4 shows example flow of packets through the protocol layers in accordance with several of various embodiments of the present disclosure.

FIG. 16 shows an example medium access control (MAC) subheader in accordance with several of various embodiments of the present disclosure.

FIG. 32 shows an example flow diagram in accordance with several of various embodiments of the present disclosure.

FIG. 33 shows an example flow diagram in accordance with several of various embodiments of the present disclosure.

DETAILED DESCRIPTION

The exemplary embodiments of the disclosed technology enable operation in a Survival Time State for a wireless device and/or one or more base stations. The exemplary disclosed embodiments may be implemented in the technical field of wireless communication systems. More particularly, the embodiments of the disclosed technology may enhance processes associated with entering or exiting the Survival Time State.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/
or a combination thereof and/or alike. For example, a base
station may support a given technology and may commu-
nicate with wireless devices with different characteristics.
The wireless devices may have different categories that
define their capabilities in terms of supporting various
features. The wireless device with the same category may
have different capabilities. The wireless devices may support
various technologies such as various releases of LTE tech-
nologies, various releases of 5G NR technologies and/or a
combination thereof and/or alike. At least some of the
wireless devices in the mobile communications system of
the present disclosure may be stationary or almost stationary.
In this disclosure, the terms "mobile communications sys-
tem" and "wireless communications system" may be used
interchangeably.

Figures 1A, 1B:
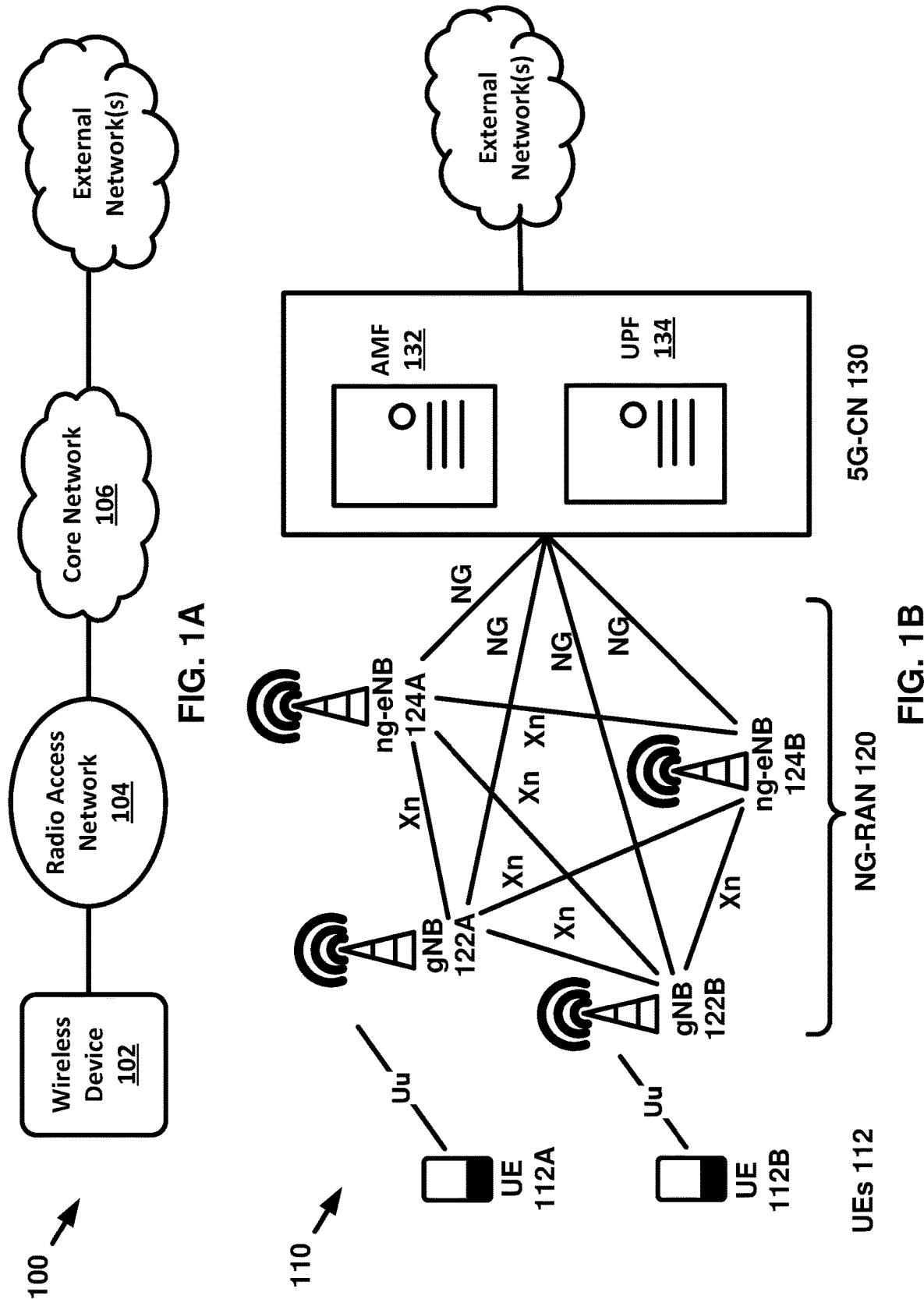
FIG. 1A and FIG. 1B show examples of mobile communications systems in accordance with several of various embodiments of the present disclosure.

FIG. 1A shows an example of a mobile communications
system 100 in accordance with several of various embodi-
ments of the present disclosure. The mobile communications
system 100 may be, for example, run by a mobile network
operator (MNO) or a mobile virtual network operator
(MVNO). The mobile communications system 100 may be
a public land mobile network (PLMN) run by a network
operator providing a variety of service including voice, data,
short messaging service (SMS), multimedia messaging ser-
vice (MMS), emergency calls, etc. The mobile communica-
tions system 100 includes a core network (CN) 106, a radio
access network (RAN) 104 and at least one wireless device
102.

The CN 106 connects the RAN 104 to one or more
external networks (e.g., one or more data networks such as
the Internet) and is responsible for functions such as authen-
tication, charging and end-to-end connection establishment.
Several radio access technologies (RATs) may be served by
the same CN 106.

The RAN 104 may implement a RAT and may operate
between the at least one wireless device 102 and the CN 106.
The RAN 104 may handle radio related functionalities such
as scheduling, radio resource control, modulation and cod-
ing, multi-antenna transmissions and retransmission proto-
cols. The wireless device and the RAN may share a portion
of the radio spectrum by separating transmissions from the
wireless device to the RAN and the transmissions from the
RAN to the wireless device. The direction of the transmis-
sions from the wireless device to the RAN is known as the
uplink and the direction of the transmissions from the RAN
to the wireless device is known as the downlink. The
separation of uplink and downlink transmissions may be
achieved by employing a duplexing technique. Example
duplexing techniques include frequency division duplexing
(FDD), time division duplexing (TDD) or a combination of
FDD and TDD.

In this disclosure, the term wireless device may refer to a
device that communicates with a network entity or another
device using wireless communication techniques. The wire-
less device may be a mobile device or a non-mobile (e.g.,
fixed) device. Examples of the wireless device include
cellular phone, smart phone, tablet, laptop computer, wear-
able device (e.g., smart watch, smart shoe, fitness trackers,
smart clothing, etc.), wireless sensor, wireless meter,
extended reality (XR) devices including augmented reality
(AR) and virtual reality (VR) devices, Internet of Things
(IoT) device, vehicle to vehicle communications device,
road-side units (RSU), automobile, relay node or any com-
bination thereof. In some examples, the wireless device
(e.g., a smart phone, tablet, etc.) may have an interface (e.g.,
a graphical user interface (GUI)) for configuration by an end user. In some examples, the wireless device (e.g., a wireless
sensor device, etc.) may not have an interface for configu-
ration by an end user. The wireless device may be referred
to as a user equipment (UE), a mobile station (MS), a
subscriber unit, a handset, an access terminal, a user termi-
nal, a wireless transmit and receive unit (WTRU) and/or
other terminology.

The at least one wireless device may communicate with at
least one base station in the RAN 104. In this disclosure, the
term base station may encompass terminologies associated
with various RATs. For example, a base station may be
referred to as a Node B in a 3G cellular system such as
Universal Mobile Telecommunication Systems (UMTS), an
evolved Node B (eNB) in a 4G cellular system such as
evolved universal terrestrial radio access (E-UTRA), a next
generation eNB (ng-eNB), a Next Generation Node B (gNB)
in NR and/or a 5G system, an access point (AP) in Wi-Fi
and/or other wireless local area networks. A base station may
be referred to as a remote radio head (RRH), a baseband unit
(BBU) in connection with one or more RRHs, a repeater or
relay for coverage extension and/or any combination
thereof. In some examples, all protocol layers of a base
station may be implemented in one unit. In some examples,
some of the protocol layers (e.g., upper layers) of the base
station may be implemented in a first unit (e.g., a central unit
(CU)) and some other protocol layer (e.g., lower layers) may
be implemented in one or more second units (e.g., distrib-
uted units (DUs)).

A base station in the RAN 104 includes one or more
antennas to communicate with the at least one wireless
device. The base station may communicate with the at least
one wireless device using radio frequency (RF) transmis-
sions and receptions via RF transceivers. The base station
antennas may control one or more cells (or sectors). The size
and/or radio coverage area of a cell may depend on the range
that transmissions by a wireless device can be successfully
received by the base station when the wireless device
transmits using the RF frequency of the cell. The base station
may be associated with cells of various sizes. At a given
location, the wireless device may be in coverage area of a
first cell of the base station and may not be in coverage area
of a second cell of the base station depending on the sizes of
the first cell and the second cell.

A base station in the RAN 104 may have various imple-
mentations. For example, a base station may be imple-
mented by connecting a BBU (or a BBU pool) coupled to
one or more RRHs and/or one or more relay nodes to extend
the cell coverage. The BBU pool may be located at a
centralized site like a cloud or data center. The BBU pool
may be connected to a plurality of RRHs that control a
plurality of cells. The combination of BBU with the one or
more RRHs may be referred to as a centralized or cloud
RAN (C-RAN) architecture. In some implementations, the
BBU functions may be implemented on virtual machines
(VMs) on servers at a centralized location. This architecture
may be referred to as virtual RAN (vRAN). All, most or a
portion of the protocol layer functions (e.g., all or portions
of physical layer, medium access control (MAC) layer
and/or higher layers) may be implemented at the BBU pool
and the processed data may be transmitted to the RRHs for
further processing and/or RF transmission. The links
between the BBU pool and the RRHs may be referred to as
fronthaul.

In some deployment scenarios, the RAN 104 may include
macrocell base stations with high transmission power levels
and large coverage areas. In other deployment scenarios, the
RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNB s 124). The general terminology for gNB s 122 and/or an ng-eNBs 124 is a base station and may be used interchangeably in this disclosure. The gNBs 122 and the ng-eNBs 124 may include one or more antennas to communicate with the UEs 112. The one or more antennas of the gNB s 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
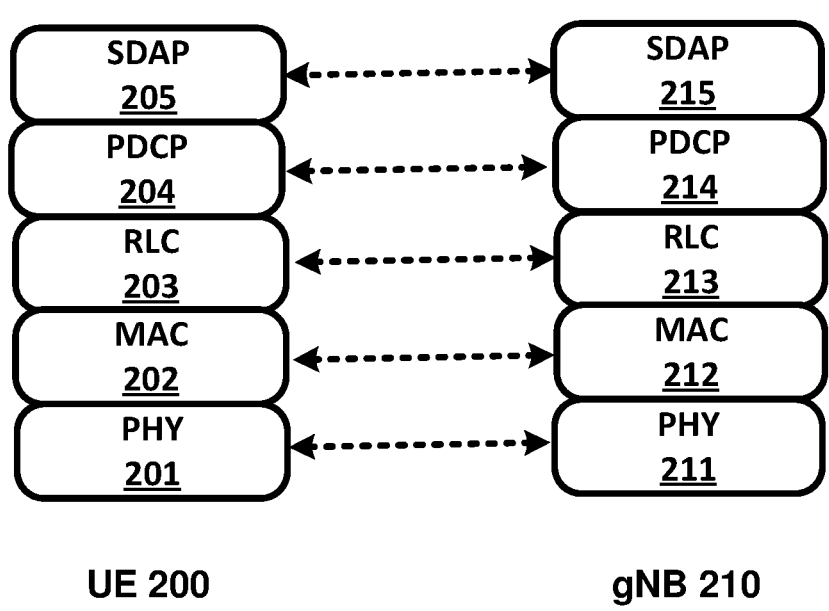
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
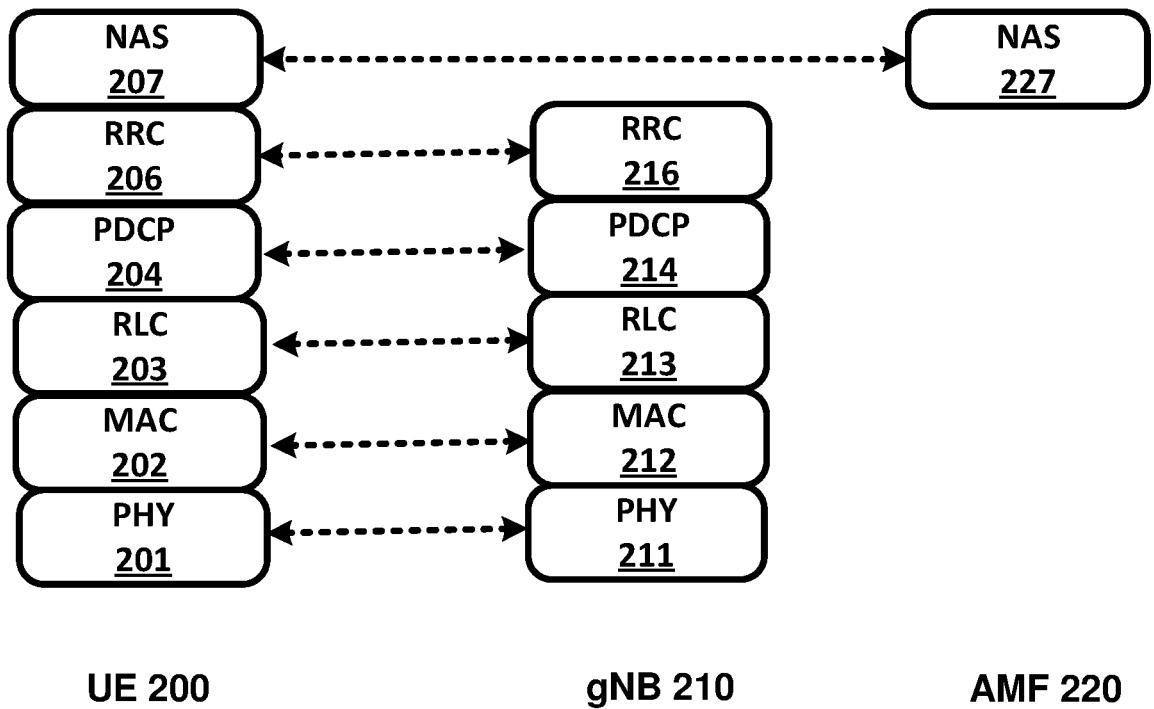

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to as RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
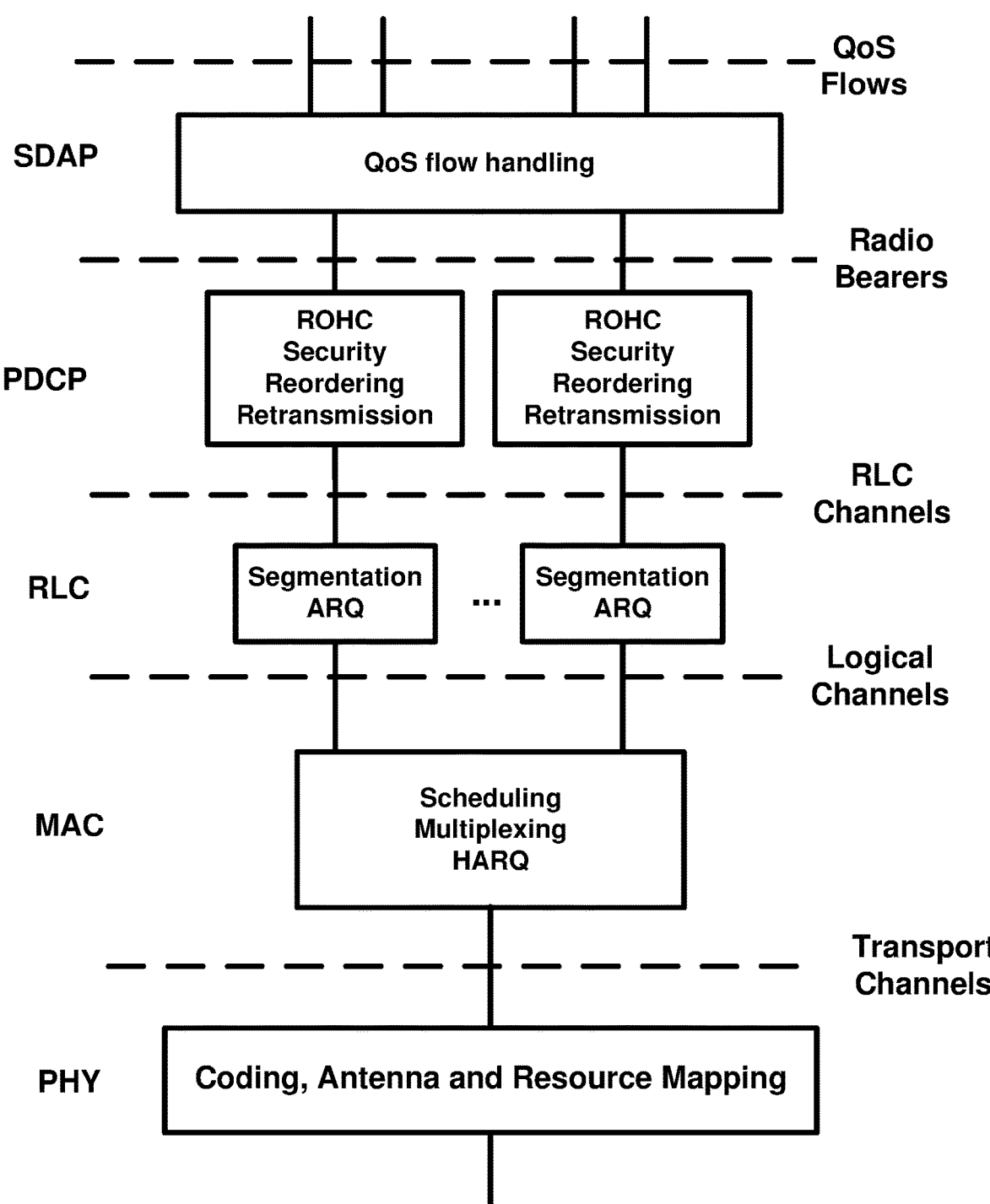
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
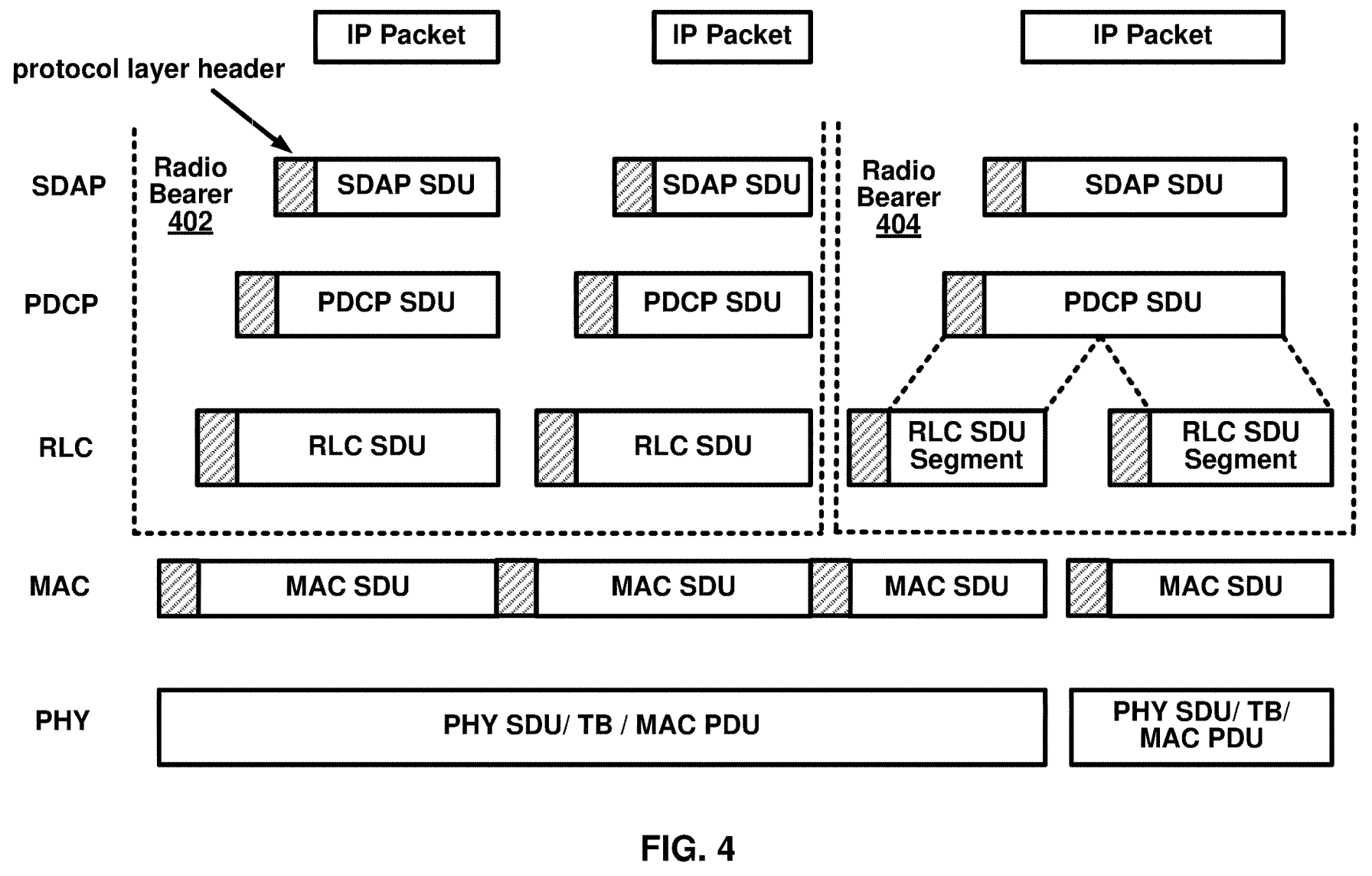

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for one or more processes, activation/deactivation of one or more processes, indication of parameters used in one or more processes, etc.

Figure 5A:
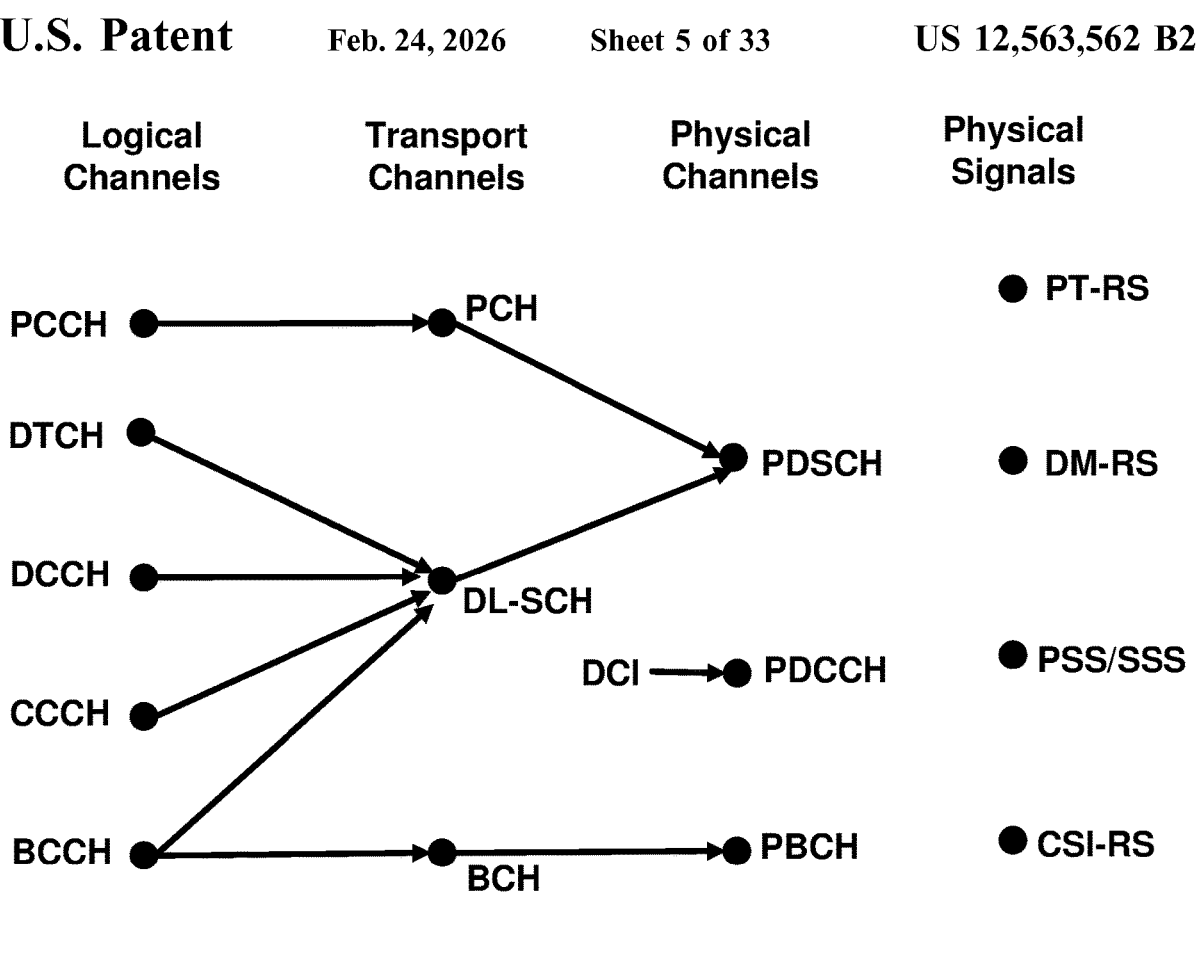
FIG. 5A shows example mapping of channels between layers of the protocol stack and different physical signals in downlink in accordance with several of various embodiments of the present disclosure.
Figure 5B:
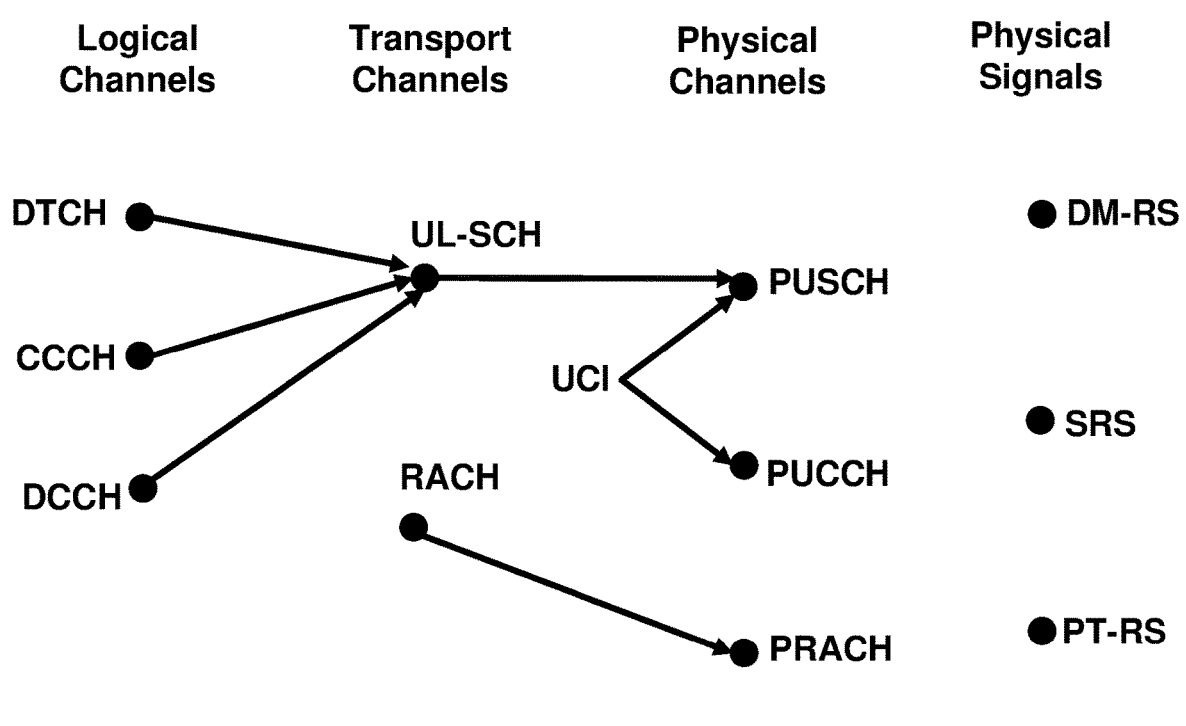
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
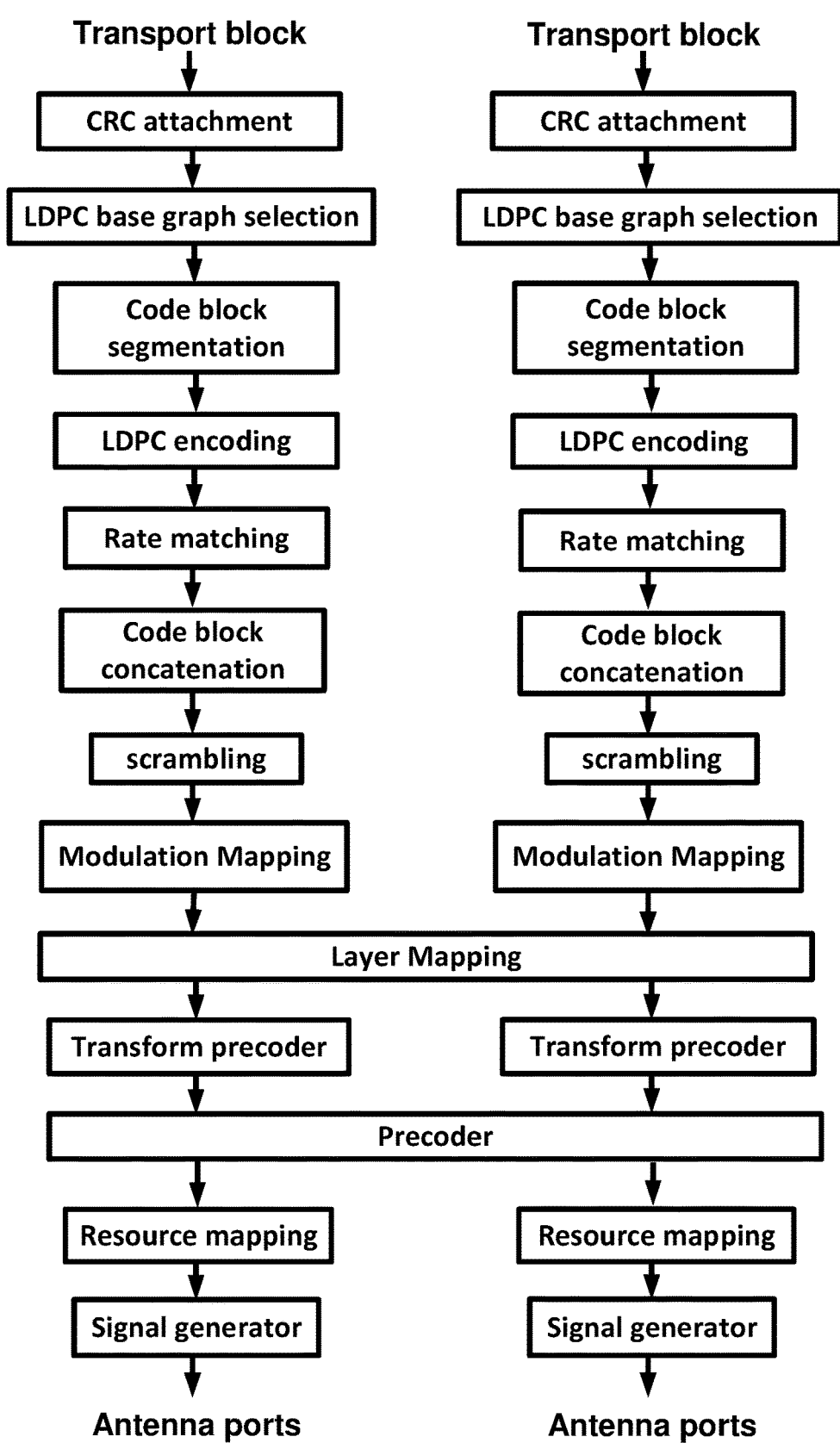
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
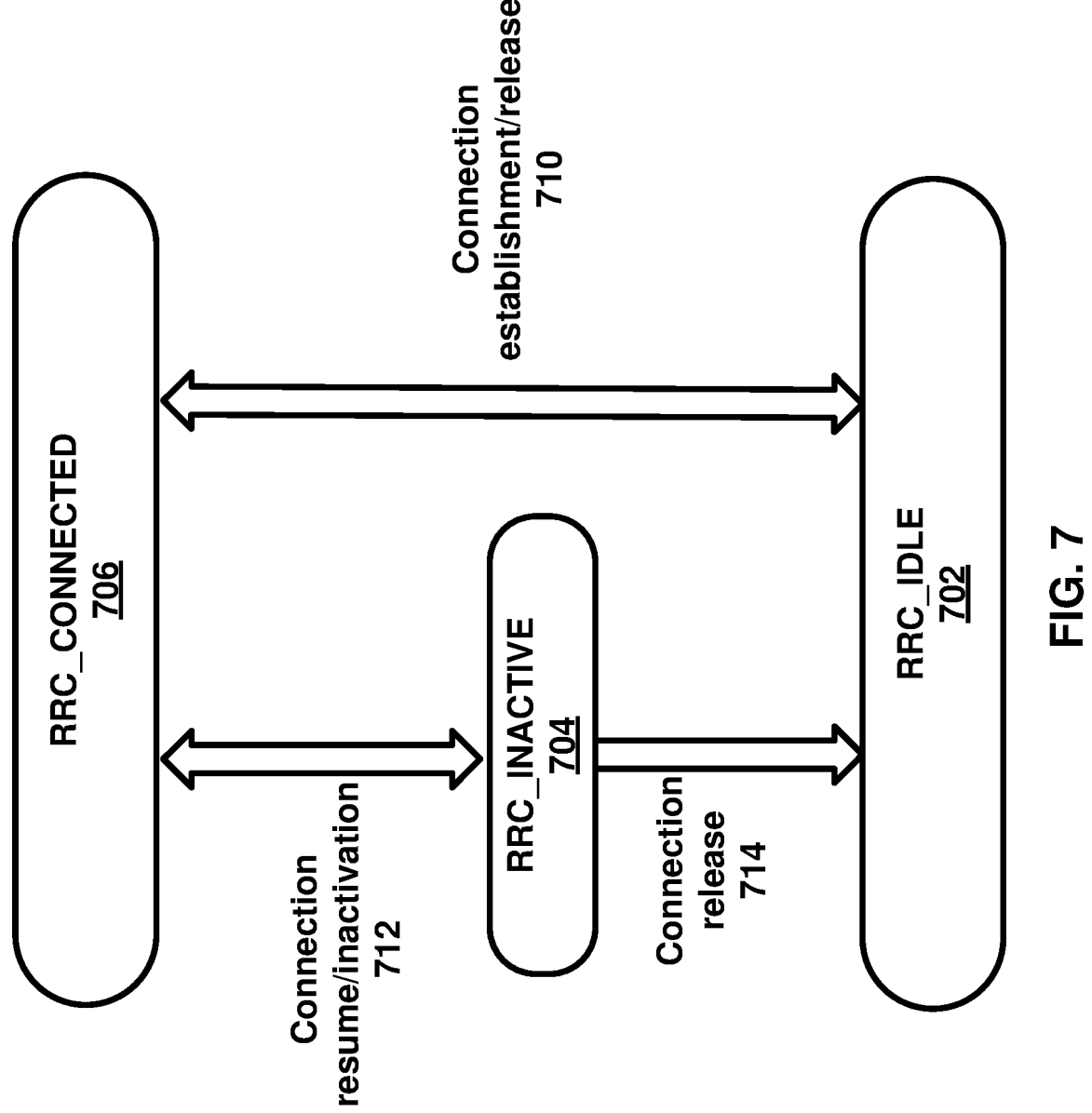
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CON-NECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), $\pi$/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7 $\mu$s. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^{\mu} \cdot 15$ KHz ($\mu = 0, 1, 2, \dots$). Example subcarrier spacings used in NR include 15 KHz ($\mu = 0$), 30 KHz ($\mu = 1$), 60 KHz ($\mu = 2$), 120 KHz ($\mu = 3$) and 240 KHz ($\mu = 4$). As discussed before, a duration of OFDM symbol is inversely proportional to the subcarrier spacing and therefor OFDM symbol duration may depend on the numerology (e.g., the $\mu$ value).

Figure 8:
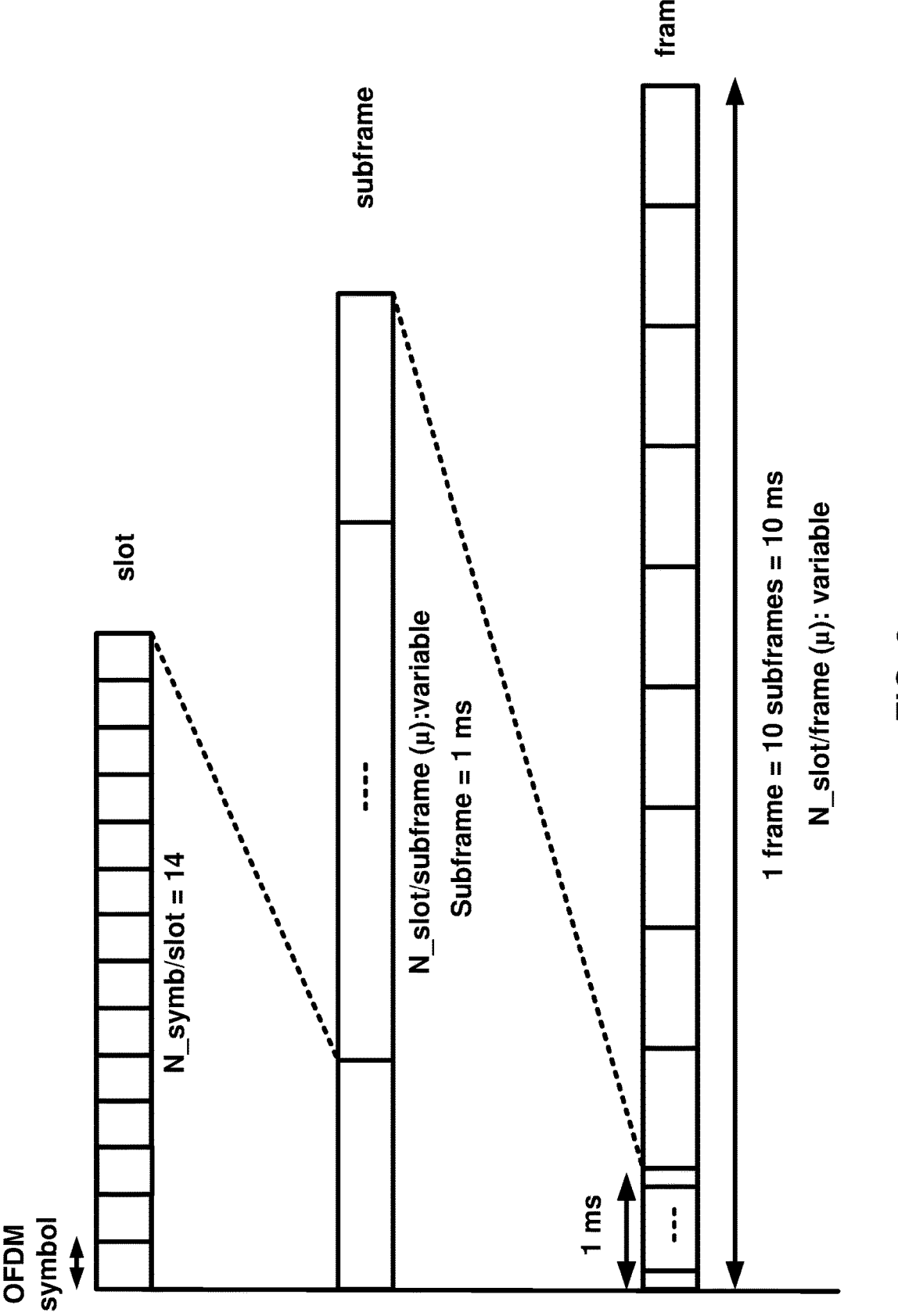
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of $\mu$ and may generally expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
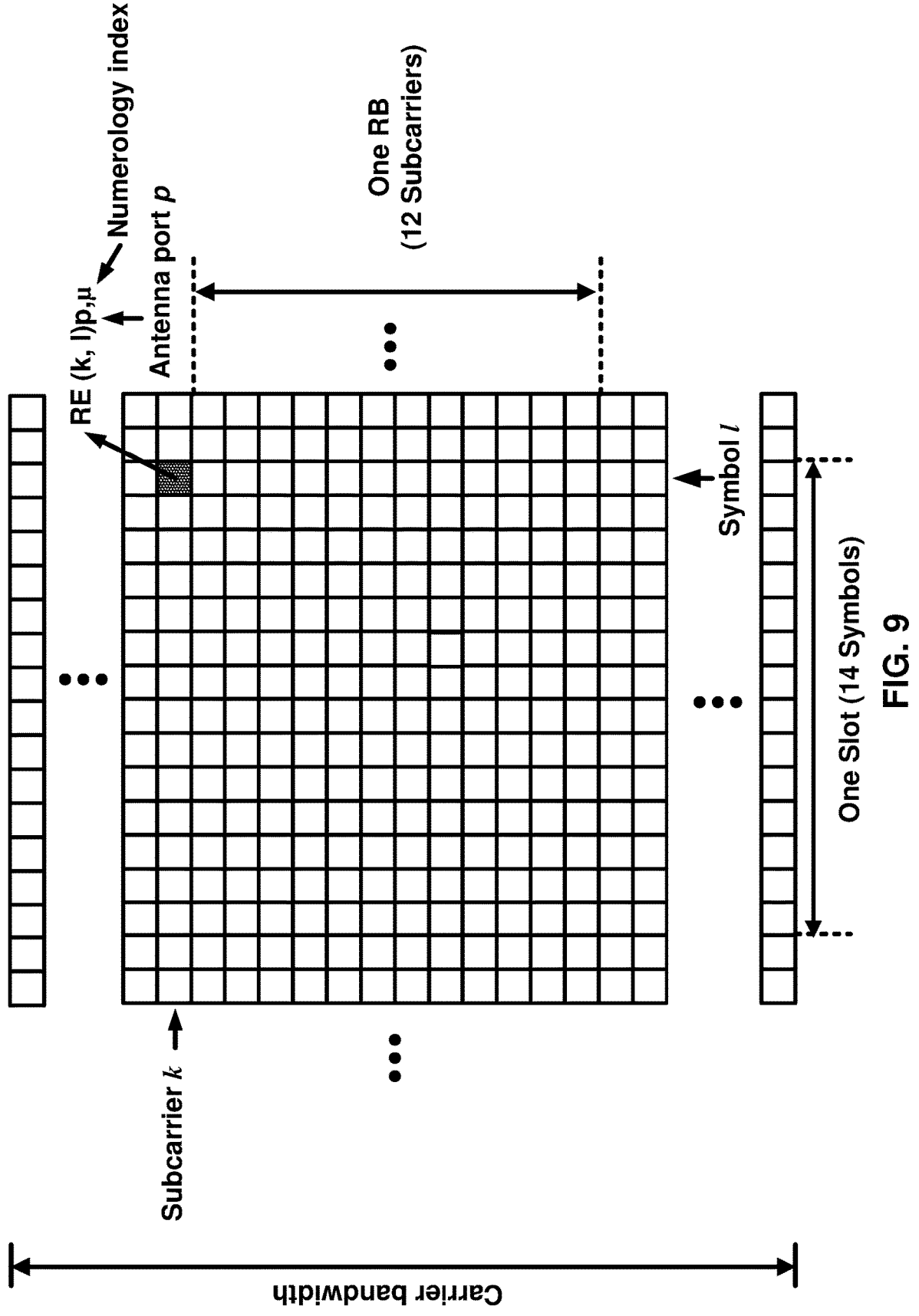
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration $\mu$ may be uniquely identified by $(k,l)_{p,\mu}$ where k is the index of a subcarrier in the frequency domain and l may refer to the symbol position in the time domain relative to some reference point. A resource block may be defined as $N_{sc}^{RB} = 12$ subcarriers. Since subcarrier spacing depends on the numerology of OFDM transmission, the frequency domain span of a resource block may be variable and may depend on the numerology. For example, for a subcarrier spacing of 15 KHz (e.g., $\mu = 0$), a resource block may be 180 KHz and for a subcarrier spacing of 30 KHz (e.g., $\mu = 1$), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
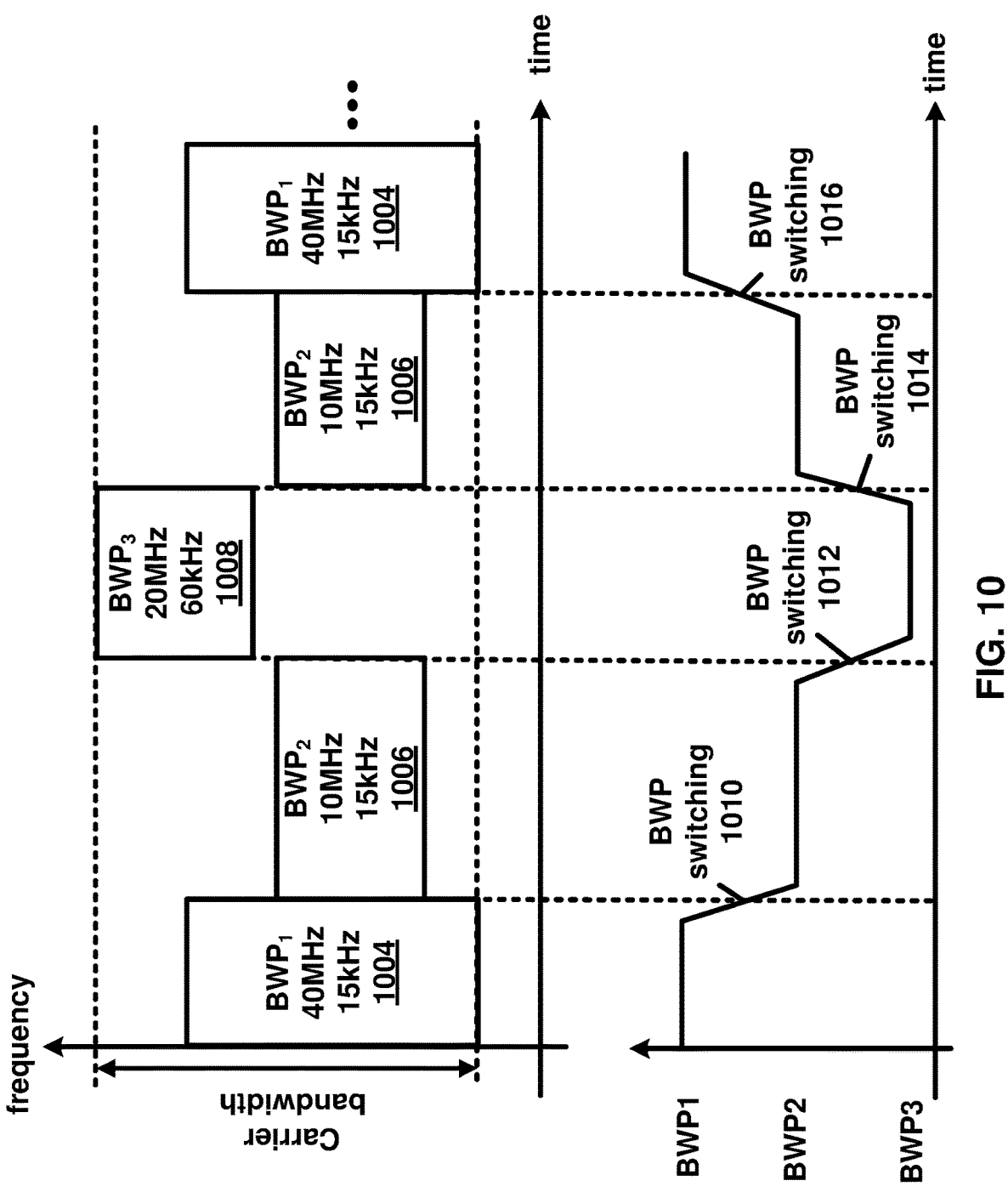
FIG. 10 shows example adaptation and switching of bandwidth parts in accordance with several of various embodiments of the present disclosure.

FIG. 10 shows an example of bandwidth part adaptation and switching. In this example, three BWPs (BWP$_1$ 1004, BWP$_2$ 1006 and BWP$_3$ 1008) are configured for a UE on a carrier bandwidth. The BWP$_1$ is configured with a bandwidth of 40 MHz and a numerology with subcarrier spacing of 15 KHz, the BWP$_2$ is configured with a bandwidth of 10 MHz and a numerology with subcarrier spacing of 15 KHz and the BWP$_3$ is configured with a bandwidth of 20 MHz and a subcarrier spacing of 60 KHz. The wireless device may switch from a first BWP (e.g., BWP$_1$) to a second BWP (e.g., BWP$_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figures 11A, 11B:
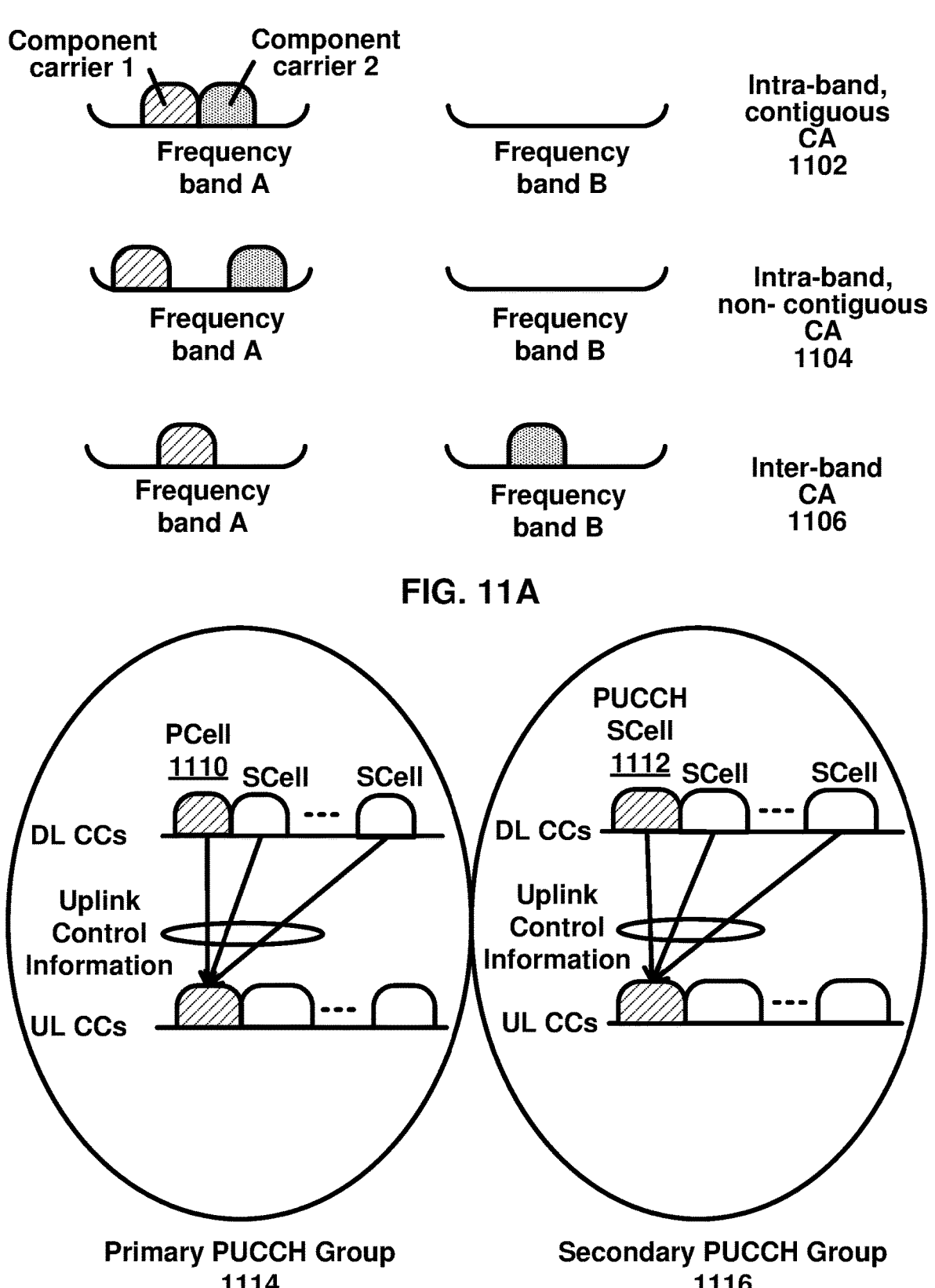
FIG. 11A shows example arrangements of carriers in carrier aggregation in accordance with several of various embodiments of the present disclosure.
FIG. 11B shows examples of uplink control channel groups in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
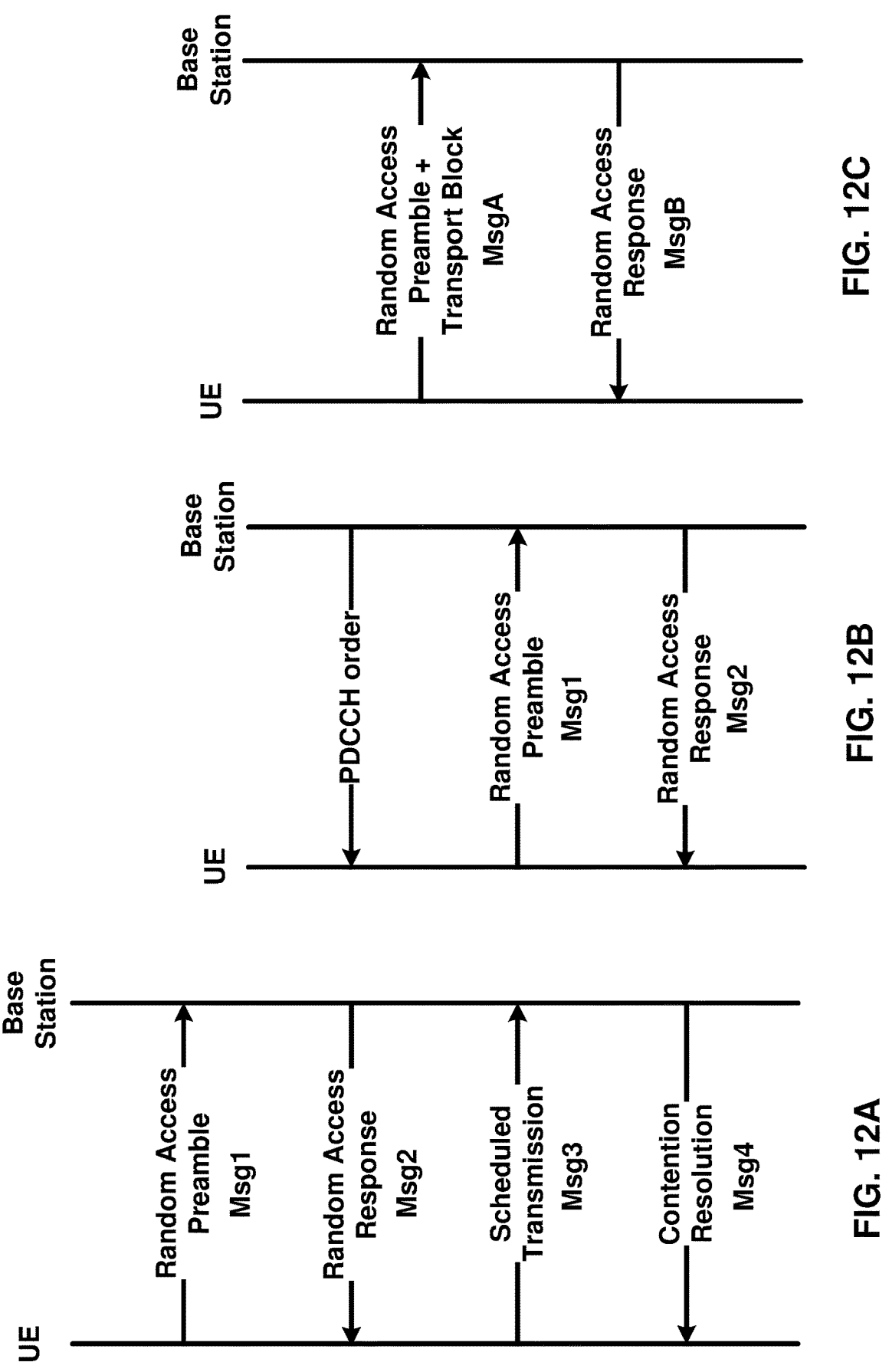
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
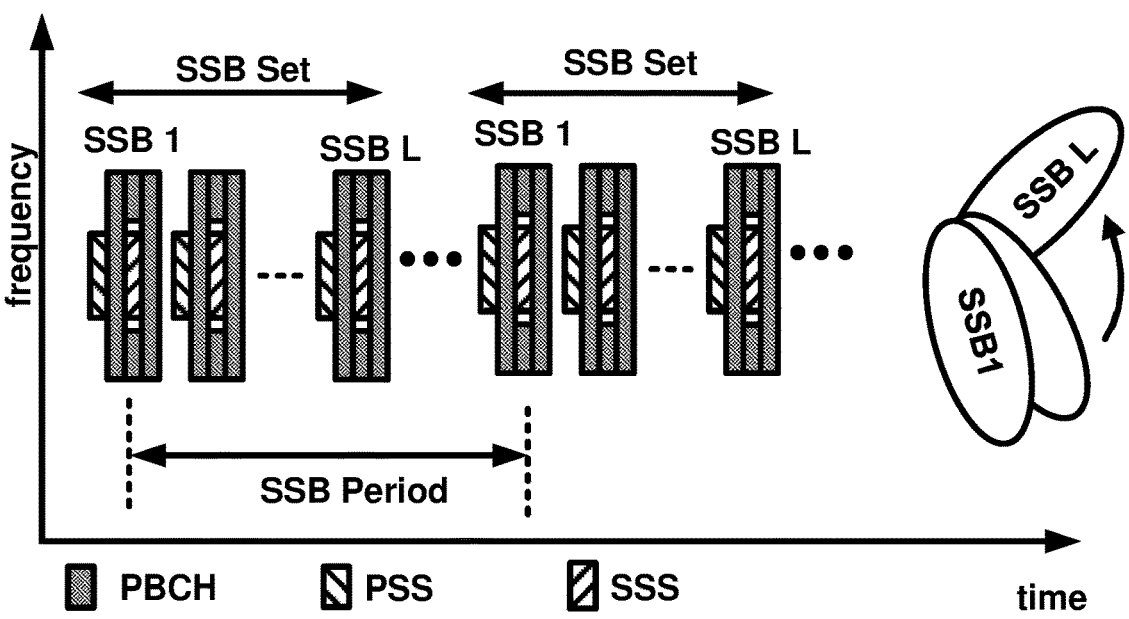
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/De-activation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH) that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
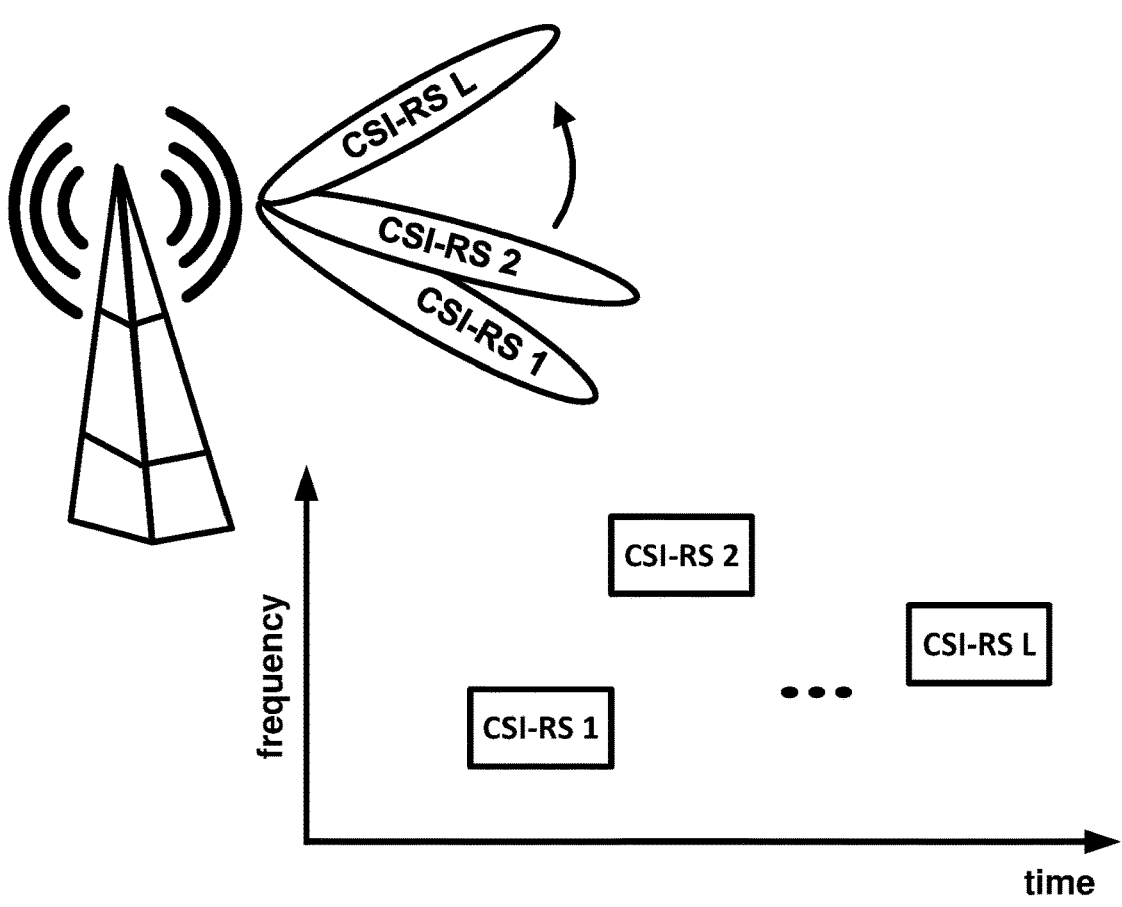
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figures 14A, 14B, 14C:
FIG. 14A, FIG. 14B and FIG. 14C show example beam management processes in accordance with several of various embodiments of the present disclosure.

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
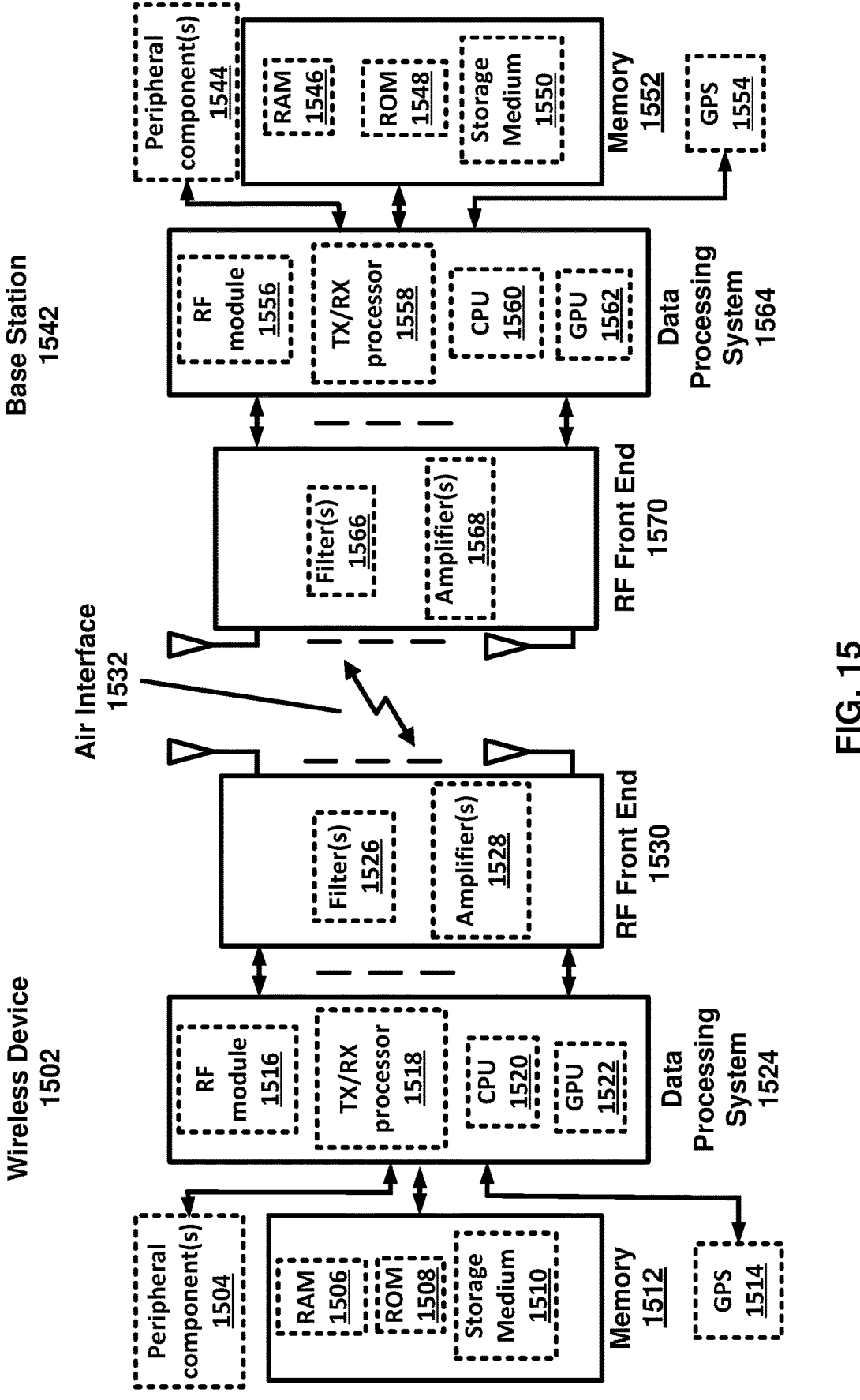
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example a survival time (ST) may be the time that an application consuming a communication service may continue without an anticipated message. In an example, a time period during which message loss may be tolerated may be used as a format for survival time (ST).

In an example, survival time may be provided by a time sensitive networking (TSN) application function (AF)/AF either in terms of maximum number of messages or in time units, where a time unit may be equivalent to the Periodicity. During a single period, single burst may be expected. If survival time is provided in terms of maximum number of messages, the SMF may convert it into time units by multiplying its value by the Periodicity provided in the TSCAI Container. The SMF may correct the survival time in time units by the previously received cumulative rateRatio from the UPF and may set the TSCAI survival time to the corrected value.

In an example, when a service flow/RB, configured with Survival Time, enters Survival Time, RAN action may be to improve the associated link reliability such that subsequent message(s) may be delivered successfully before the Survival Time is violated. The wireless network and the base station may utilize the survival time information to monitor survival time and, when entering survival time, improve the associated link reliability so that any subsequent message(s) may be delivered to meet its service level requirement.

In an example, a time period for which the application layer can tolerate failures in a wireless network may be called the survival time (ST).

In an example, based on network configuration, ST may be supported in an unlicensed controlled environment (UCE).

In an example, survival state triggers/monitors in the UE may be different between licensed bands and UCE depending on the configuration.

In an example, periodic traffic (e.g., traffic arriving and/or transmitted based on a periodicity) may be considered for ST.

In an example, for ST support, one application message may be conveyed by one PDCP SDU.

In an example, for ST support, one application message may be conveyed by varying number of PDCP SDUs.

In an example, based on survival time monitoring, a UE may identify a failure and may enter a survival time state.

In an example, a survival state may be entered either upon receiving an indication (e.g., an implicit NACK (e.g., a DCI scheduling a retransmission of a CG).

In an example, a survival state may be entered based on an RLC ARQ explicit NACK.

In an example for UCE, a survival state may be entered upon encountering LBT failure(s), NACK, or CG retransmission timer expiry.

In an example for licensed band or UCE, UE may exit survival state upon receiving an explicit ACK or upon CG timer expiry.

In an example, to satisfy survival time constraint, PDCP duplication (e.g., autonomous PDCP duplication) may be used.

In an example, to satisfy survival time constraint, adaptation of L1/L2 parameters may be used.

In an example, pro-active packet reliability boosting may be used for cases where gNB/UE cannot be guaranteed to detect packet loss within Survival Time.

In an example, a UE Tx-side timer may be used to track survival state once entered. In an example, a UE may be configured by the network to autonomously activate PDCP duplication in survival state without explicit knowledge of the remaining survival time.

In an example, survival Time may be explicitly signaled to the UE.

In an example, the network may configure the UE to autonomously activate PDCP duplication upon entering survival state without explicit survival time requirement signaling.

In an example, following entry into the Survival Time state, PDCP duplication for ST configuration may be activated. The gNB pre-configures which RLC entities may be activated for duplication when entering ST.

In an example, a MAC protocol data unit (PDU) may be a bit string that is byte aligned (e.g., multiple of 8 bits) in length. The bit strings may be represented by tables in which the most significant bit is the leftmost bit of the first line of the table, the least significant bit is the rightmost bit on the last line of the table, and more generally the bit string is to be read from left to right and then in the reading order of the lines. The bit order of each parameter field within a MAC PDU is represented with the first and most significant bit in the leftmost bit and the last and least significant bit in the rightmost bit.

In an example, a MAC service data unit (SDU) may be a bit string that is byte aligned (e.g., multiple of 8 bits) in length. A MAC SDU may be included into a MAC PDU from the first bit onward.

In an example, a MAC CE may be a bit string that is byte aligned (e.g., multiple of 8 bits) in length.

In an example, a MAC subheader may be a bit string that is byte aligned (e.g., multiple of 8 bits) in length. A MAC subheader may be placed immediately in front of the corresponding MAC SDU, MAC CE, or padding.

In an example, a MAC PDU may comprise one or more MAC subPDUs. Each MAC subPDU may comprise one of the following: a MAC subheader only (including padding); a MAC subheader and a MAC SDU; a MAC subheader and a MAC CE; a MAC subheader and padding.

In an example, the MAC SDUs may be of variable sizes.

In an example, a MAC subheader may correspond to either a MAC SDU, a MAC CE, or padding.

Figure 16:
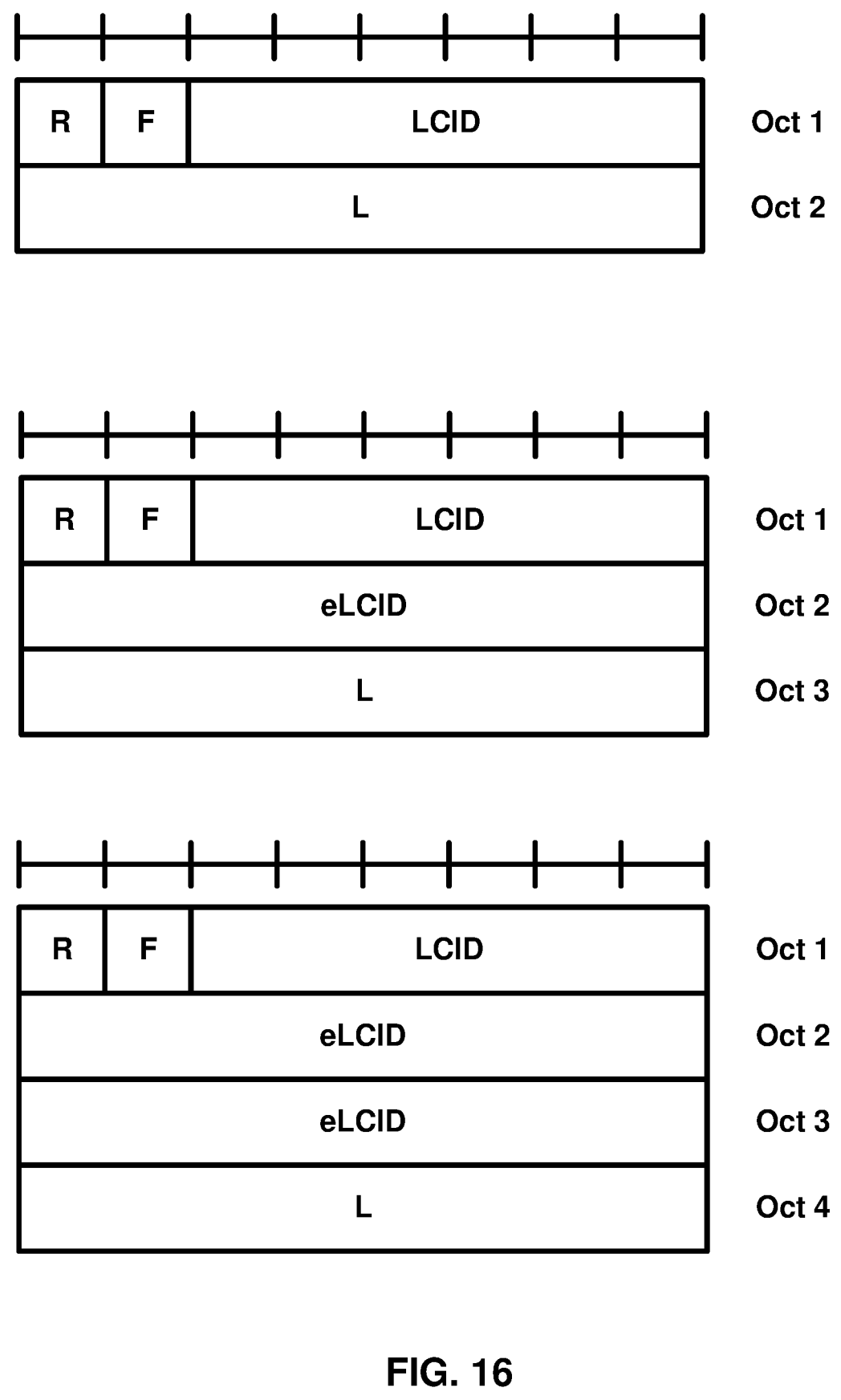
Figure 17:
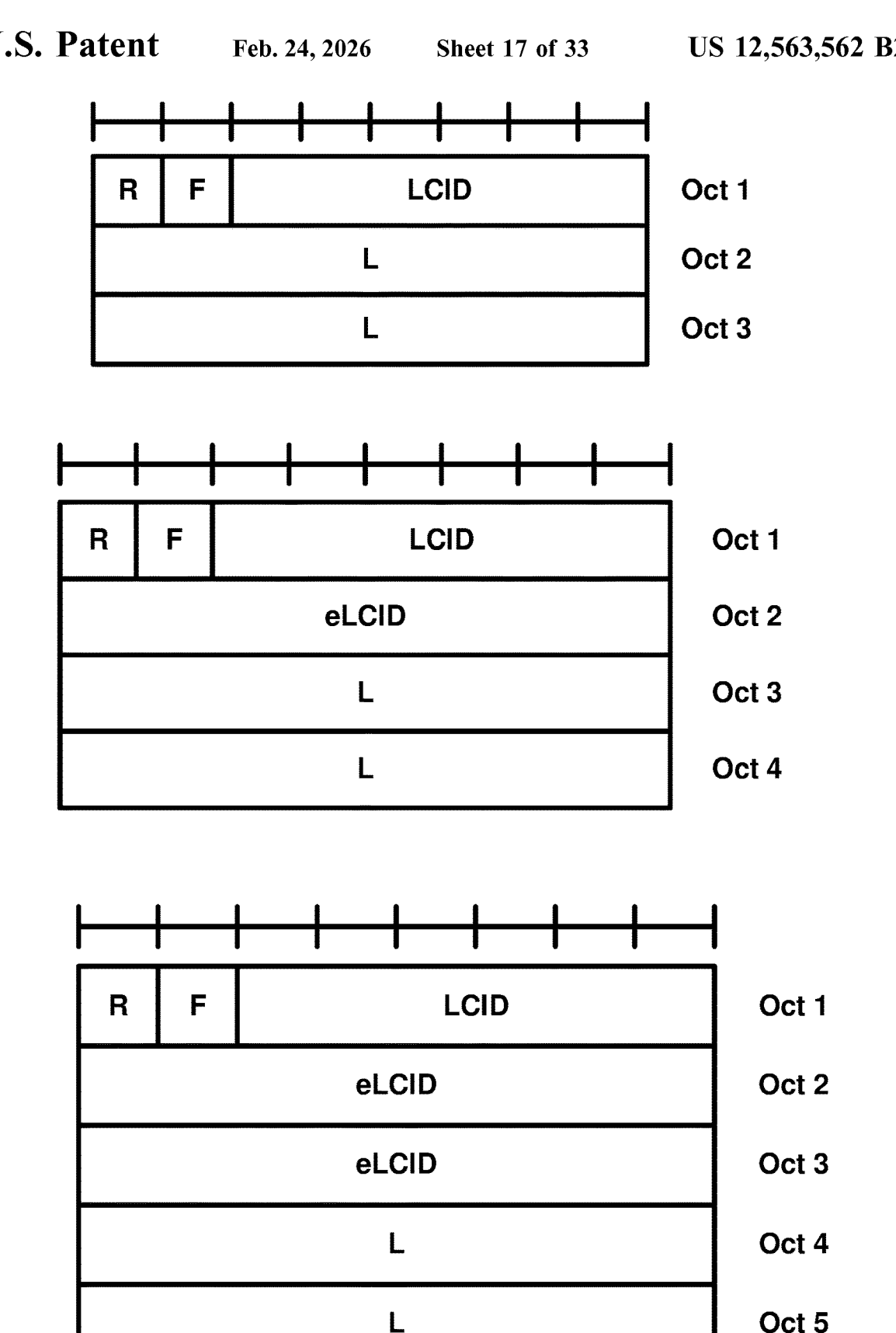
FIG. 17 shows an example MAC subheader in accordance with several of various embodiments of the present disclosure.
Figure 18:
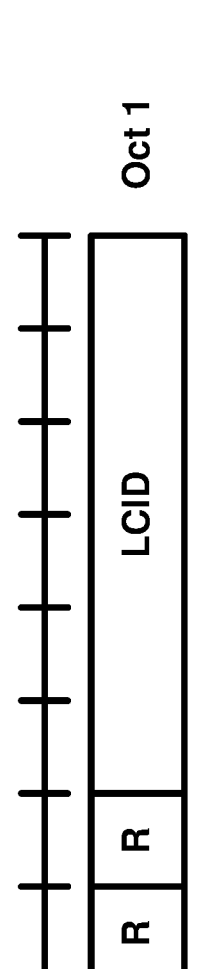
FIG. 18 shows an example MAC subheader in accordance with several of various embodiments of the present disclosure.
Figure 18:
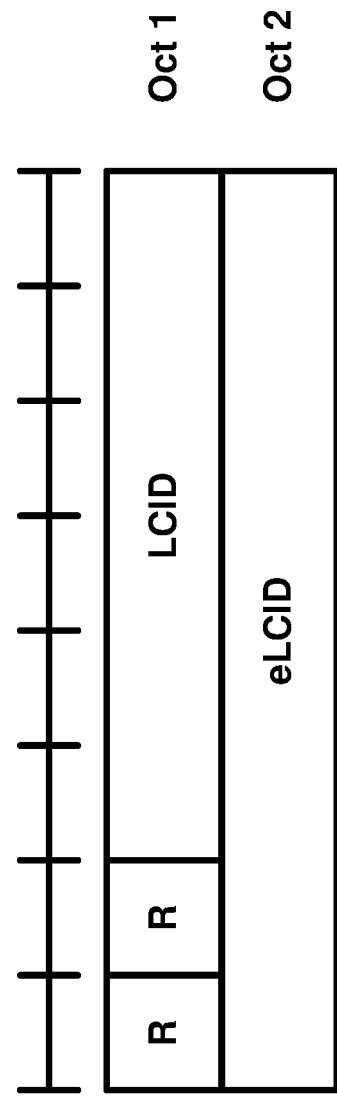

In an example, a MAC subheader except for fixed sized MAC CE, padding, and a MAC SDU containing UL CCCH may comprise the header fields R/F/LCID/(eLCID)/L. A MAC subheader for fixed sized MAC CE, padding, and a MAC SDU containing UL CCCH may comprise the two header fields R/LCID/(eLCID). Example R/F/LCID/(eLCID)/L MAC subheader with 8-bit L field is shown in FIG. 16. Example R/F/LCID/(eLCID)/L MAC subheader with 16-bit L field is shown in FIG. 17. Example R/LCID/(eLCID) MAC subheader is shown in FIG. 18.

Figure 19:
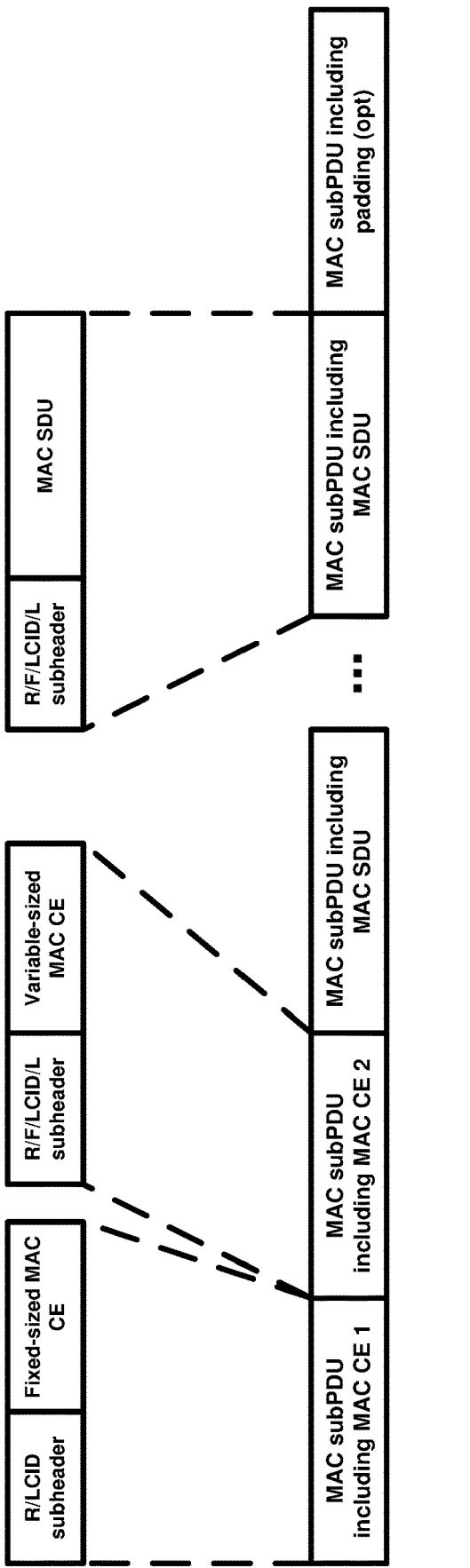
FIG. 19 shows an example MAC protocol data unit (PDU) in accordance with several of various embodiments of the present disclosure.
Figure 20:
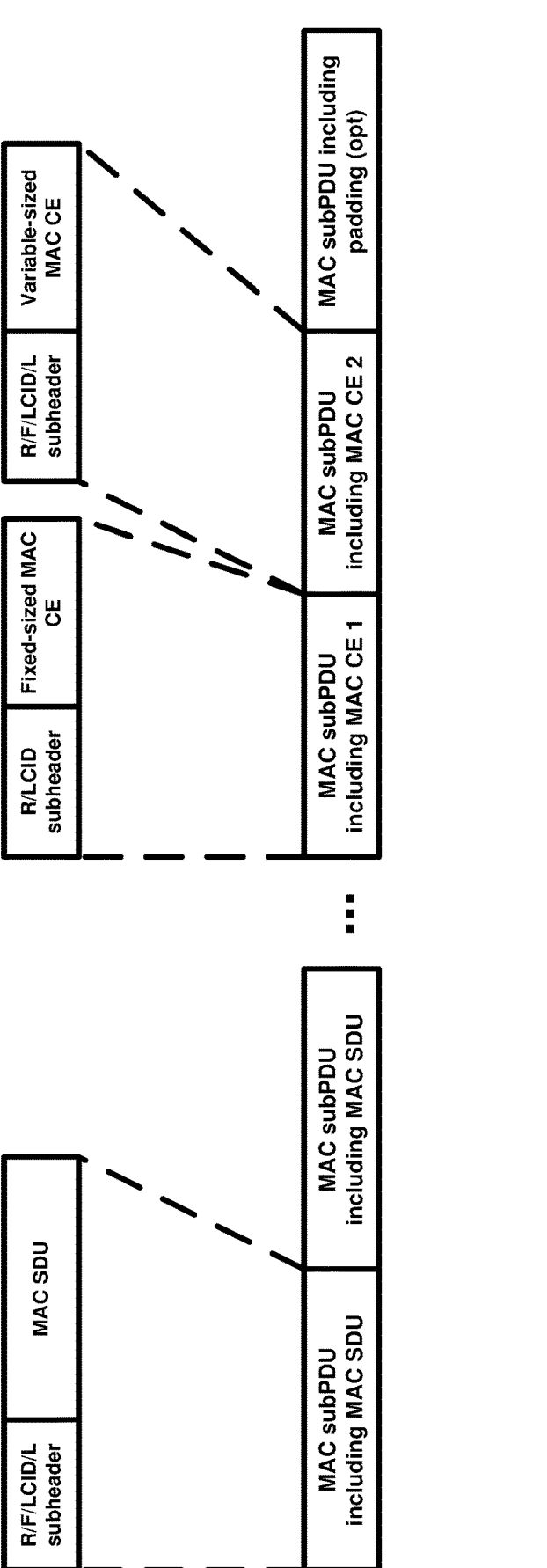
FIG. 20 shows an example MAC PDU in accordance with several of various embodiments of the present disclosure.

An example of a DL MAC PDU is shown in FIG. 19. An example of an UL MAC PDU is shown in FIG. 20. In an example, MAC CEs may be placed together. DL MAC subPDU(s) with MAC CE(s) may be placed before a MAC subPDU with MAC SDU and MAC subPDU with padding. UL MAC subPDU(s) with MAC CE(s) may be placed after the MAC subPDU(s) with MAC SDU and before the MAC subPDU with padding in the MAC PDU as depicted in FIG. 20. The size of padding can be zero.

In an example, a maximum of one MAC PDU may be transmitted per TB per MAC entity.

In an example of MAC subheader for DL-SCH and UL-SCH, the MAC subheader may comprise an LCID field and/or an eLCID field and/or an L field and/or a F field. The Logical Channel ID (LCID) field may identify the logical channel instance of the corresponding MAC SDU or the type of the corresponding MAC CE or padding for the DL-SCH and UL-SCH respectively. There may be one LCID field per MAC subheader. The size of the LCID field may be 6 bits. If the LCID field is set to 34, one additional octet may be present in the MAC subheader containing the eLCID field and may follow the octet containing LCID field. If the LCID field is set to 33, two additional octets may be present in the MAC subheader containing the eLCID field and these two additional octets may follow the octet containing LCID field. The extended Logical Channel ID (eLCID) field may identify the logical channel instance of the corresponding MAC SDU or the type of the corresponding MAC CE for the DL-SCH and UL-SCH respectively. The size of the eLCID field may be either 8 bits or 16 bits. The Length (L) field may indicate the length of the corresponding MAC SDU or variable-sized MAC CE in bytes. There may be one L field per MAC subheader except for subheaders corresponding to fixed-sized MAC CEs, padding, and MAC SDUs containing UL CCCH. The size of the L field may be indicated by the F field. The Format (f) field may indicate the size of the Length field. There may be one F field per MAC subheader except for subheaders corresponding to fixed-sized MAC CEs, padding, and MAC SDUs containing UL CCCH. The size of the F field may be 1 bit. The value 0 may indicate 8 bits of the Length field. The value 1 may indicate 16 bits of the Length field.

In an example, the MAC subheader may be octet aligned.

Figure 21:
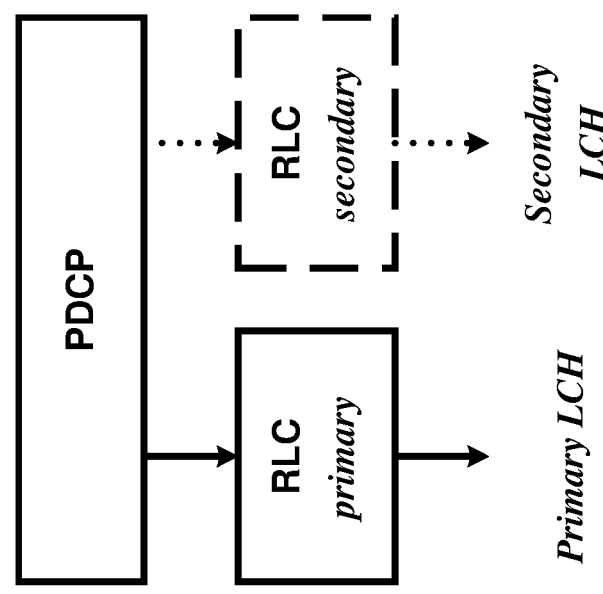
FIG. 21 shows an example packet duplication process in accordance with several of various embodiments of the present disclosure.

In an example, when duplication is configured for a radio bearer by RRC, at least one secondary RLC entity may be added to the radio bearer to handle the duplicated PDCP PDUs as depicted on FIG. 21, where the logical channel corresponding to the primary RLC entity may be referred to as the primary logical channel, and the logical channel corresponding to the secondary RLC entity(ies), the secondary logical channel(s). All RLC entities may have the same RLC mode. Duplication at PDCP may comprise submitting the same PDCP PDUs multiple times: once to each activated RLC entity for the radio bearer. With multiple independent transmission paths, packet duplication may increase reliability and reduces latency and is especially beneficial for ultra-reliable low-latency (URLLC) services.

In an example, when configuring duplication for a DRB, RRC may sets the state of PDCP duplication (either activated or deactivated) at the time of (re-)configuration. After the configuration, the PDCP duplication state may be dynamically controlled by means of a MAC control element and in dual connectivity (DC), the UE may apply the MAC CE commands regardless of their origin (master cell group (MCG) or secondary cell group (SCG)).

In an example, when duplication is configured for an SRB the state may be active and may not be dynamically controlled. When configuring duplication for a DRB with more than one secondary RLC entity, RRC may set the state of each of them (e.g., either activated or deactivated). Subsequently, a MAC CE may be used to dynamically control whether each of the configured secondary RLC entities for a DRB may be activated or deactivated, e.g., which of the RLC entities may be used for duplicate transmission. Primary RLC entity may not be deactivated. When duplication is deactivated for a DRB, secondary RLC entities associated to this DRB may be deactivated. When a secondary RLC entity is deactivated, it may not be re-established, the HARQ buffers may not be flushed, and the transmitting PDCP entity may indicate to the secondary RLC entity to discard duplicated PDCP PDUs.

In an example, when activating duplication for a DRB, NG-RAN may ensure that at least one serving cell is activated for each logical channel associated with an activated RLC entity of the DRB; and when the deactivation of SCells leaves no serving cells activated for a logical channel of the DRB, NG-RAN may ensure that duplication is deactivated for the RLC entity associated with the logical channel.

In an example, when duplication is activated, the original PDCP PDU and the corresponding duplicate(s) may not be transmitted on the same carrier. The logical channels of a radio bearer configured with duplication may either belong to the same MAC entity (referred to as CA duplication) or to different ones (referred to as DC duplication). CA duplication may be configured in either or both of the MAC entities together with DC duplication when duplication over more than two legs is configured in the UE. In CA duplication, logical channel mapping restrictions may be used in a MAC entity to ensure that the different logical channels of a radio bearer in the MAC entity are not sent on the same carrier. When CA duplication is configured for an SRB, one of the logical channels associated to the SRB may be mapped to SpCell.

In an example, when CA duplication is deactivated for a DRB in a MAC entity (e.g., none or only one of RLC entities of the DRB in the MAC entity may remain activated), the logical channel mapping restrictions of the logical channels of the DRB may be lifted for as long as CA duplication remains deactivated for the DRB in the MAC entity.

In an example, when an RLC entity acknowledges the transmission of a PDCP PDU, the PDCP entity may indicate to the other RLC entity(ies) to discard it. In addition, in case of CA duplication, when an RLC entity restricted to only SCell(s) reaches the maximum number of retransmissions for a PDCP PDU, the UE may inform the gNB but may not trigger RLF.

In an example, if one or more DRB s are configured with PDCP duplication, the network may activate and deactivate the PDCP duplication for all or a subset of associated RLC entities for the configured DRB(s).

In an example, the PDCP duplication for the configured DRB(s) may be activated and deactivated by: receiving the Duplication Activation/Deactivation MAC CE; by receiving the Duplication RLC Activation/Deactivation MAC CE; or by indication by RRC.

In an example, the PDCP duplication for all or a subset of associated RLC entities for the configured DRB(s) may be activated and deactivated by: receiving the Duplication RLC Activation/Deactivation MAC CE; or by indication by RRC.

In an example, for each DRB configured with PDCP duplication: if a Duplication Activation/Deactivation MAC CE is received activating the PDCP duplication of the DRB: the MAC entity may indicate the activation of PDCP duplication of the DRB to upper layers.

In an example, for each DRB configured with PDCP duplication: if a Duplication Activation/Deactivation MAC CE is received deactivating the PDCP duplication of the DRB: the MAC entity may indicate the deactivation of PDCP duplication of the DRB to upper layers.

In an example, for each DRB configured with PDCP duplication: if a Duplication RLC Activation/Deactivation MAC CE is received activating PDCP duplication for associated RLC entities of a DRB configured with PDCP duplication: the MAC entity may indicate the activation of PDCP duplication for the indicated secondary RLC entity(ies) of the DRB to upper layers.

In an example, for each DRB configured with PDCP duplication: if a Duplication RLC Activation/Deactivation MAC CE is received deactivating PDCP duplication for associated RLC entities of a DRB configured with PDCP duplication: the MAC entity may indicate the deactivation of PDCP duplication for the indicated secondary RLC entity (ies) of the DRB to upper layers.

Figure 22:
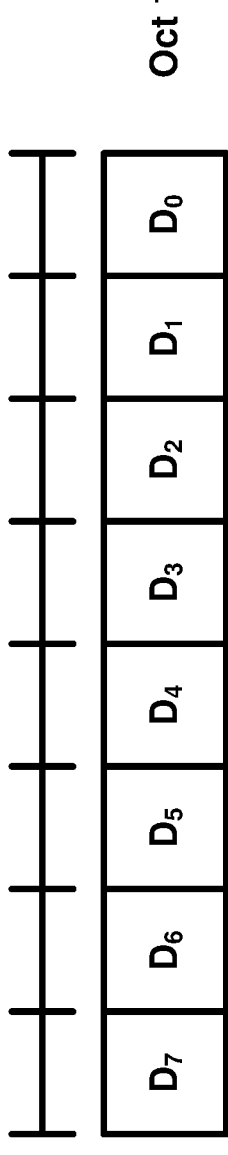
FIG. 22 shows an example MAC CE in accordance with several of various embodiments of the present disclosure.

In an example, the Duplication Activation/Deactivation MAC CE of one octet may be identified by a MAC subheader with a corresponding LCID. It may have a fixed size and may comprise of a single octet containing eight D-fields. The Duplication Activation/Deactivation MAC CE may be defined, for a MAC entity, as shown in FIG. 22. Di field may indicate the activation/deactivation status of the PDCP duplication of DRB i where i may be the ascending order of the DRB ID among the DRBs configured with PDCP duplication and with RLC entity(ies) associated with this MAC entity. The Di field may be set to 1 to indicate that the PDCP duplication of DRB i may be activated. The Di field may be set to 0 to indicate that the PDCP duplication of DRB i may be deactivated.

Figure 23:
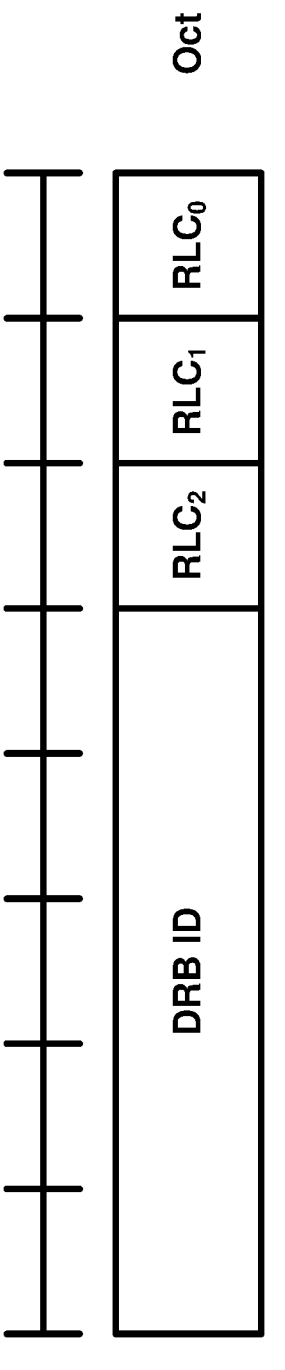
FIG. 23 shows an example MAC CE in accordance with several of various embodiments of the present disclosure.

In an example, the Duplication RLC Activation/Deactivation MAC CE may be identified by a MAC subheader with a corresponding eLCID as specified. It may have a fixed size and consists of a single octet defined as shown in FIG. 23. The DRB ID field may indicate the identity of DRB for which the MAC CE applies. The length of the field may be 5 bits. The RLCi field may indicate the activation/deactivation status of PDCP duplication for the RLC entity i where i may be ascending order of logical channel ID of secondary RLC entities in the order of MCG and SCG, for the DRB. The RLCi field may be set to 1 to indicate that the PDCP duplication for the RLC entity i may be activated. The RLCi field may be set to 0 to indicate that the PDCP duplication for the RLC entity i may be deactivated.

In an example, an IE LogicalChannelConfig may be used to configure the logical channel parameters. A parameter allowedServingCells may be mandatory present if the DRB/SRB associated with a logical channel is configured with PDCP CA duplication in UL in the cell group in which this IE is included (e.g., the PDCP entity is associated with multiple RLC entities belonging to this cell group).

In an example, an IE PDCP-Config may be used to set the configurable PDCP parameters for signaling and data radio bearers. A parameter duplicationState may indicate the uplink PDCP duplication state for the associated RLC entities at the time of receiving this IE. If set to true, the PDCP duplication state may be activated for the associated RLC entity. The index for the indication may be determined by ascending order of logical channel ID of all RLC entities other than the primary RLC entity indicated by primaryPath in the order of MCG and SCG. If the number of associated RLC entities other than the primary RLC entity is two, UE may ignore the value in the largest index of this field. If the field is absent, the PDCP duplication states may be deactivated for associated RLC entities.

In an example, a parameter pdcp-Duplication may indicate whether or not uplink duplication status at the time of receiving this IE is configured and activated. The presence of this field may indicate that duplication is configured. PDCP duplication may not be configured for CA packet duplication of LTE RLC bearer. The value of this field, when the field is present, may indicate the state of the duplication at the time of receiving this IE. If set to true, duplication may be activated. The value of this field may be true, when configured for a SRB. For PDCP entity with more than two associated RLC entities for UL transmission, this field may be present. If the field moreThanTwoRLC-DRB is present, the value of this field may be ignored and the state of the duplication may be indicated by duplicationState. For PDCP entity with more than two associated RLC entities, only NR RLC bearer may be supported.

In an example, a parameter primaryPath may indicate the cell group ID and LCID of the primary RLC entity for UL data transmission when more than one RLC entity s associated with the PDCP entity.

In example embodiments, a wireless device may receive one or more messages (e.g., one or more RRC messages) comprising configuration parameters. The configuration parameters may comprise radio bearer configuration parameters. The radio bearer configuration parameters may indicate that a first radio bearer (RB) is configured with a survival time (ST) operation. For example, a first configuration parameter of the first RB may indicate that the first RB is configured with ST operation. For example, a true value of the first configuration parameter may indicate that the ST operation is configured/enabled/activated for the first RB. The first RB may be associated with a plurality of RLC entities. The configuration parameters (e.g., the first configuration parameters of the first RB) may indicate the plurality of the RLC entities associated with the first RB.

Figure 24:
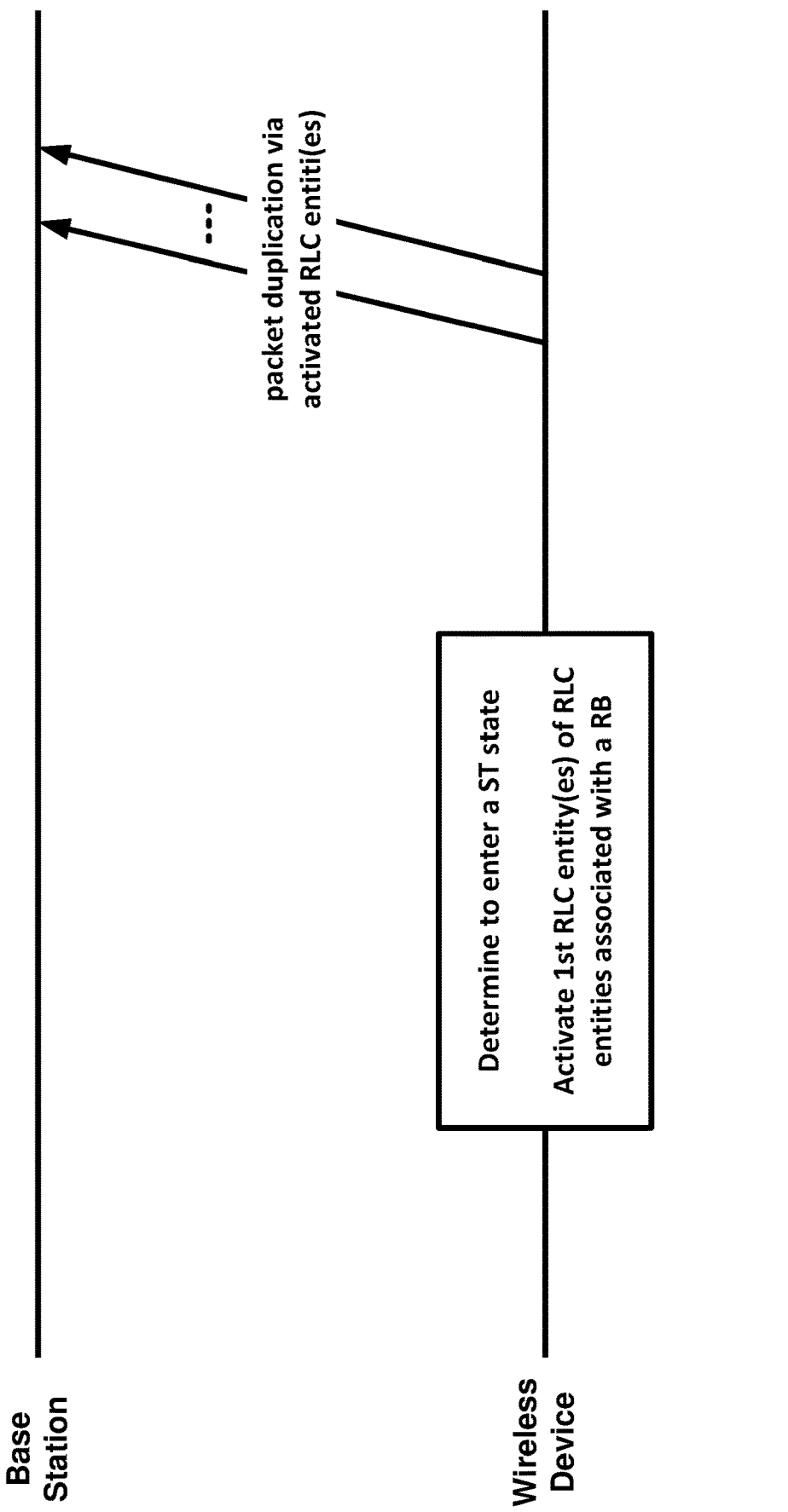
FIG. 24 shows an example process in accordance with several of various embodiments of the present disclosure.

In an example embodiment as shown in FIG. 24, a wireless device may determine to enter to a survival time (ST) state. The entry to the ST state may be RB specific. The wireless may enter/determine to enter the ST state for the first RB and may not enter the ST state for a second RB. The wireless device may activate one or more first RLC entities of a plurality of RLC entities associated with the first RB. The wireless device may activate one or more first RLC entities of a plurality of RLC entities associated with the first RB in response to entering the ST state for the first RB. In an example, the wireless device may receive one or more configuration parameters indicating the one or more first RLC entities of the plurality of RLC entities associated with the first RB to be activated in response to determining to enter/entering the ST state for the first RB.

In an example embodiment, the wireless device may receive configuration parameters indicating a plurality of configurations for activation of RLC entities in response to entering the ST state for the first RB. Each configuration, of the plurality of configurations, may indicate a corresponding subset of the plurality of RLC entities associated with the first RB. The wireless device may determine to activate the one or more first RLC entities based on a first configuration of the plurality of configurations for RLC activation in response to entering/determining to enter the ST state. The wireless device may determine to activate the RLC entity (es) based on the first configuration of the plurality of configurations.

The activation of the one or more first RLC entities may be for activation of PDC duplication. The wireless device may transmit packets using PDCP duplication and based on the one or more first activated RLC entities in response to activation of the one or more first RLC entities and/or in response to entering the ST state.

In an example, entering/determining to enter the ST state, by the wireless device for the first RB, may be based on a number of negative acknowledgements associated with one or more transport blocks comprising data of the first RB. A negative acknowledgement may be a HARQ NACK and/or other signals indicating HARQ NACK (such as a retransmission grant). In an example, the number of the negative acknowledgements may be the number of HARQ NACKs. In an example, the number of the negative acknowledgements may be the number of retransmission grants indicating negative acknowledgement. In an example, the number of negative acknowledgements may be a number of combination of HARQ NACKs and retransmission grants indicating negative acknowledgements.

The wireless device may determine a metric based on the number of negative acknowledgements (e.g., the number of HARQ NACKs or the number of retransmission grants or the number of combination of HARQ NACKs and retransmission grants). The determining to enter the ST state for the first RB may be based on comparing the number of negative acknowledgements with a first number or based on comparing the metric with a first number. The first number may be pre-configured (e.g., 1, 2, . . . ) or may be configurable (e.g., via a configuration parameter, e.g., an RRC configuration parameter). In an example, the wireless device may determine the first configuration, of the plurality of configurations for activation of RLC entities that are activated in response to entering the ST state for the first RB, based on the number of the negative acknowledgements and/or based on comparing the number of negative acknowledgements with a threshold (e.g., the first number). In an example, the wireless device may determine the first configuration, of the plurality of configurations for activation of RLC entities that are activated in response to entering the ST state for the first RB, based on the metric (e.g., based on comparing the metric with a threshold, e.g., the first number).

Figure 25:
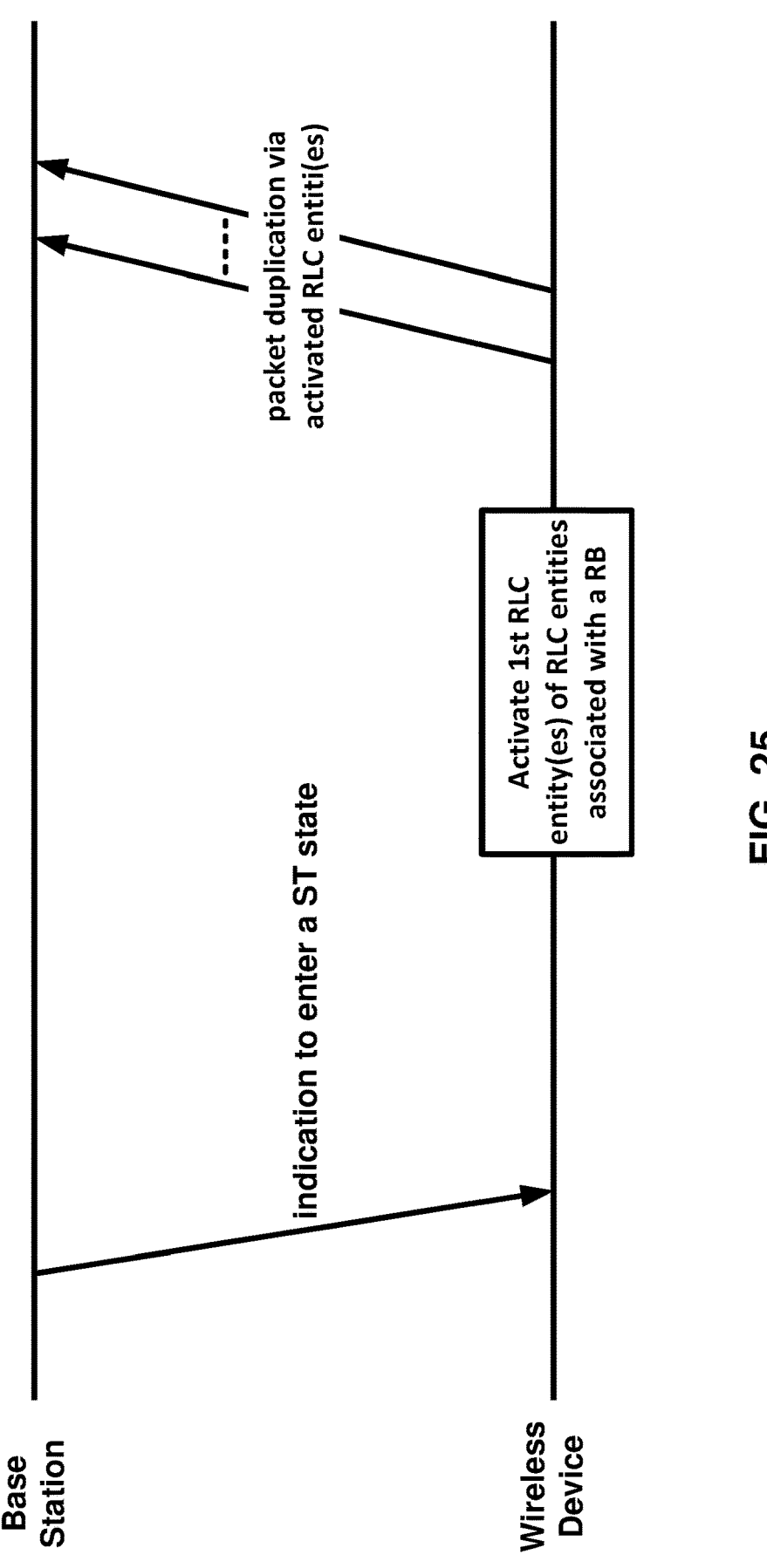
FIG. 25 shows an example process in accordance with several of various embodiments of the present disclosure.

In an example embodiment as shown in FIG. 25, a wireless device may receive an indication (e.g., physical layer signaling) indicating entering to the ST state. The entry to the ST state may be RB specific. The wireless may enter the ST state for the first RB and may not enter the ST state for a second RB. The wireless device may activate one or more first RLC entities of a plurality of RLC entities associated with the first RB. The wireless device may activate one or more first RLC entities of a plurality of RLC entities associated with the first RB in response to receiving the indication to enter the ST state for the first RB. In an example, the wireless device may receive one or more configuration parameters indicating the one or more first RLC entities of the plurality of RLC entities associated with the first RB to be activated in response to receiving the indication to enter the ST state for the first RB.

In an example embodiment, the wireless device may receive configuration parameters indicating a plurality of configurations for activation of RLC entities in response to entering/receiving the indication to enter the ST state for the first RB. Each configuration, of the plurality of configurations, may indicate a corresponding subset of the plurality of RLC entities associated with the first RB. The wireless device may determine to activate the one or more first RLC entities based on a first configuration of the plurality of configurations for RLC activation in response to entering/receiving the indication to enter the ST state. The wireless device may determine to activate the RLC entity(es) based on the first configuration of the plurality of configurations.

The activation of the one or more first RLC entities may be for activation of PDC duplication. The wireless device may transmit packets using PDCP duplication and based on the one or more first activated RLC entities in response to activation of the one or more first RLC entities and/or in response to entering the ST state.

In an example, the indication to enter the ST state may be based on a DCI. In an example, the DCI may be a retransmission grant for a TB comprising data of the first RB. In an example, the DCI may be a configured grant activation DCI, e.g., for activation of a configured grant configuration to be used while in the ST state. In an example, the DCI may comprise a field with a value indicating the first RB and/or an identifier of the first RB.

Figure 26:
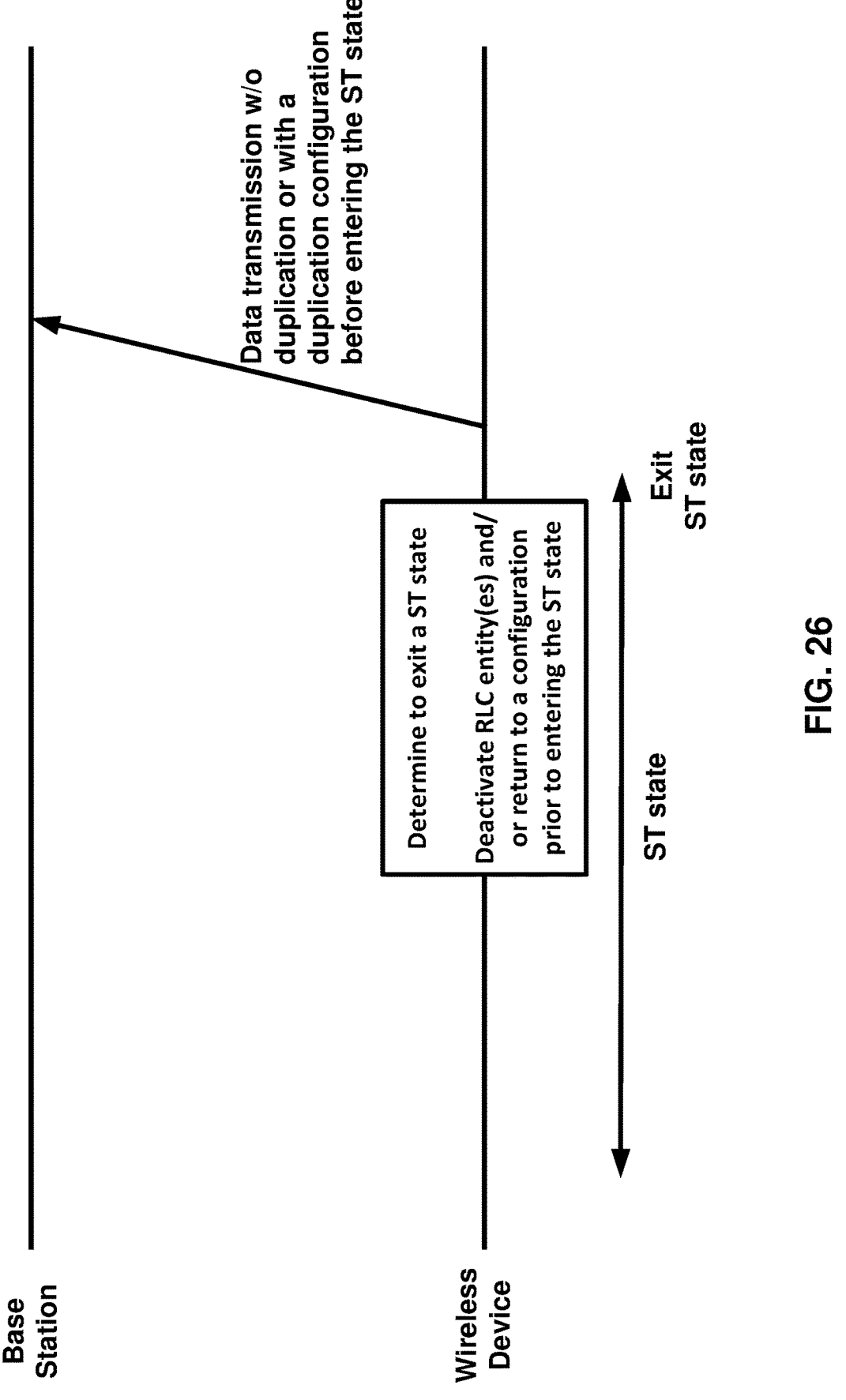
FIG. 26 shows an example process in accordance with several of various embodiments of the present disclosure.

In an example embodiment as shown in FIG. 26, after entering the ST state and while operating in the ST state, the wireless device may determine to exit the ST state for the first RB. The exit from a ST state may be RB specific. The wireless device may determine to exit the ST state for the first RB and may determine to remain in the ST state for a second RB. In response to determining to exit the ST state for the first RB, the wireless device may deactivate one or more first RLC entities of the plurality of RLC entities (e.g., the one or more first RLC entities that were activated in response to entry to the ST state for the first RB) and/or the wireless device may deactivate a PDCP duplication configuration (e.g., the PDCP duplication configuration that was activated in response to entering the ST state).

In an example, the exiting/determining to exit the ST state, by the wireless device for the first RB, may be based on a number of negative acknowledgements associated with one or more transport blocks comprising data of the first RB. A negative acknowledgement may be a HARQ NACK and/or other signals indicating HARQ NACK (such as a retransmission grant). In an example, the number of the negative acknowledgements may be the number of HARQ NACKs. In an example, the number of the negative acknowledgements may be the number of retransmission grants indicating negative acknowledgement. In an example, the number of negative acknowledgements may be a number of combination of HARQ NACKs and retransmission grants indicating negative acknowledgement.

The wireless device may determine a metric based on the number of negative acknowledgements (e.g., the number of HARQ NACKs or the number of retransmission grants or the number of combination of HARQ NACKs and retransmission grants). The determining to exit the ST state for the first RB may be based on comparing the number of negative acknowledgements with a first number or based on comparing the metric with a first number. The first number may be pre-configured (e.g., 0, 1, . . . ) or may be configurable (e.g., via a configuration parameter, e.g., an RRC configuration parameter). In an example, the number/threshold used for entering a ST state may be different from a number/threshold used for determining to exit the ST state.

In an example, the exiting/determining to exit the ST state, by the wireless device for the first RB, may be based on a number of positive acknowledgements associated with one or more transport blocks comprising data of the first RB. The wireless device may determine a metric based on the number of the positive acknowledgements. The determining to exit the ST state for the first RB may be based on comparing the number of positive acknowledgements with a first number or based on comparing the metric with a first number. The first number may be pre-configured (e.g., 1, 2, . . . ) or may be configurable (e.g., via a configuration parameter, e.g., an RRC configuration parameter). In an example, the number/threshold used for entering a ST state may be different from a number/threshold used for determining to exit the ST state.

Figure 28:
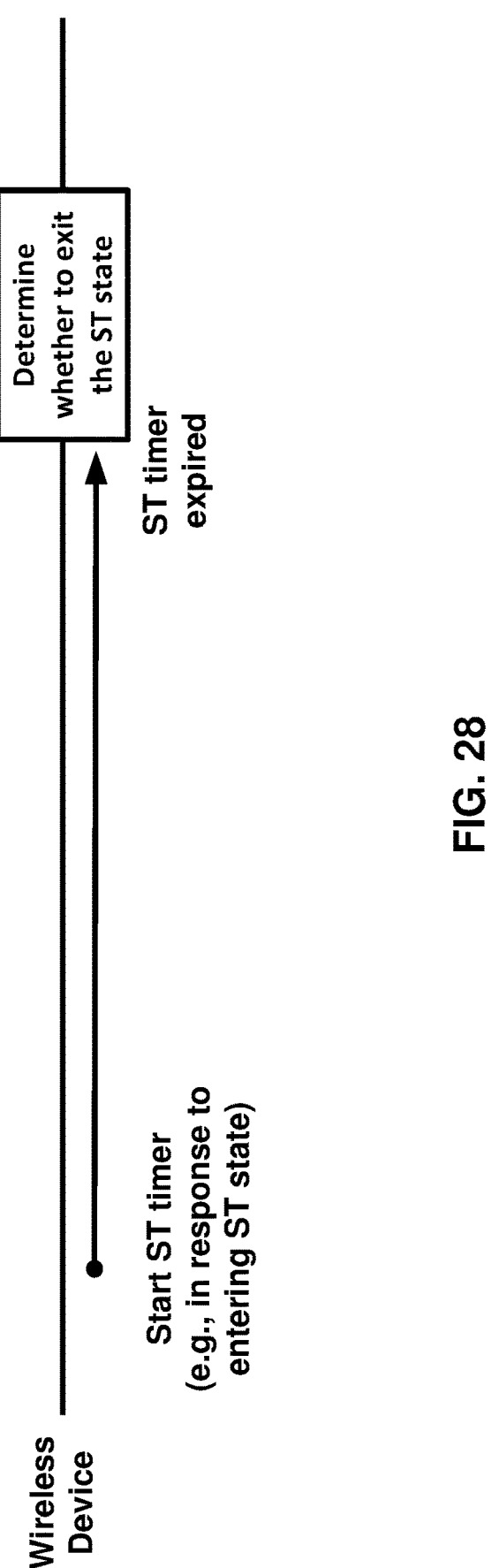
FIG. 28 shows an example process in accordance with several of various embodiments of the present disclosure.

In an example embodiment as shown in FIG. 28, the determining to whether exit the ST state may be based on expiry of a timer (e.g., a ST timer). The wireless device may start the timer in response to entering the ST state for the first RB. In an example, while the ST timer is running, the wireless device may not exit the ST state. The value of the timer (e.g., the ST timer) may be pre-configured and/or configurable (e.g., via a configuration parameter, e.g., an RRC parameter). In an example, the wireless device may determine to exit the ST state prior to expiry of the ST timer based on comparison of the negative or positive acknowledgements and/or their associated metrics with one or more thresholds.

Figure 27:
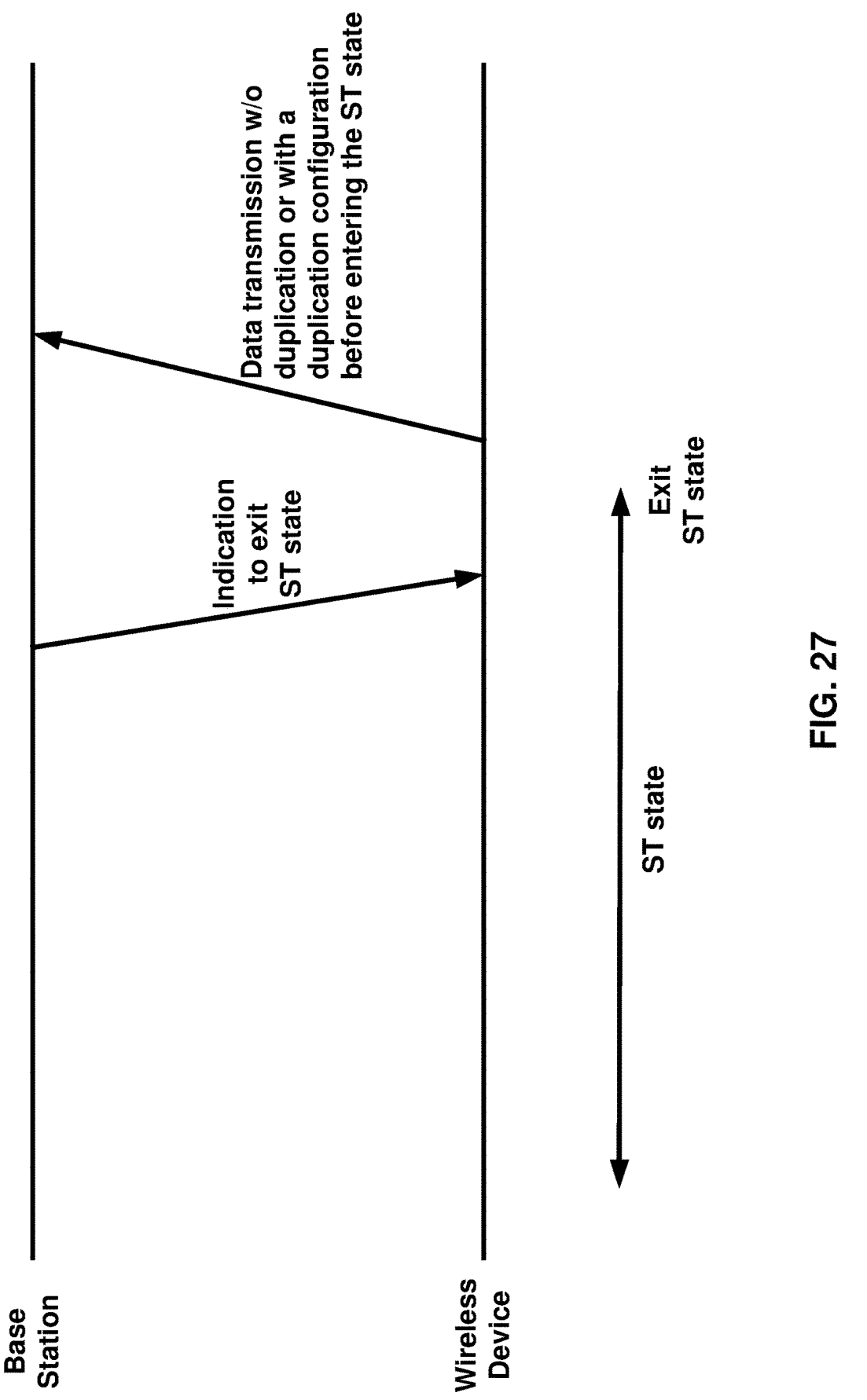
FIG. 27 shows an example process in accordance with several of various embodiments of the present disclosure.

In an example embodiment as shown in FIG. 27, after entering the ST state and while operating in the ST state, the wireless device may receive an indication (e.g., a physical layer indication (e.g., a DCI) or a MAC layer indication (e.g., a MAC CE)) indicating to exit a ST state. The exit from a ST state may be RB specific. The wireless device may determine to exit the ST state for the first RB and may determine to remain in the ST state for a second RB. In response to receiving the indication indicating to exit the ST state for the first RB, the wireless device may deactivate one or more first RLC entities of the plurality of RLC entities (e.g., the one or more first RLC entities that were activated in response to entry to the ST state for the first RB) and/or the wireless device may deactivate a PDCP duplication configuration (e.g., the PDCP duplication configuration that was activated in response to entering the ST state). In an example, the indication may be based on a DCI. In an example, the indication may be based on a MAC CE. In an example, the indication (e.g., the DCI or the MAC CE) may comprise a field with a value indicating the first RB and/or an identifier of the first RB. In an example, the indication (e.g., the DCI or the MAC CE) may comprise a field with a value indicating a HARQ process number associated with a TB comprising the first RB.

Figure 29:
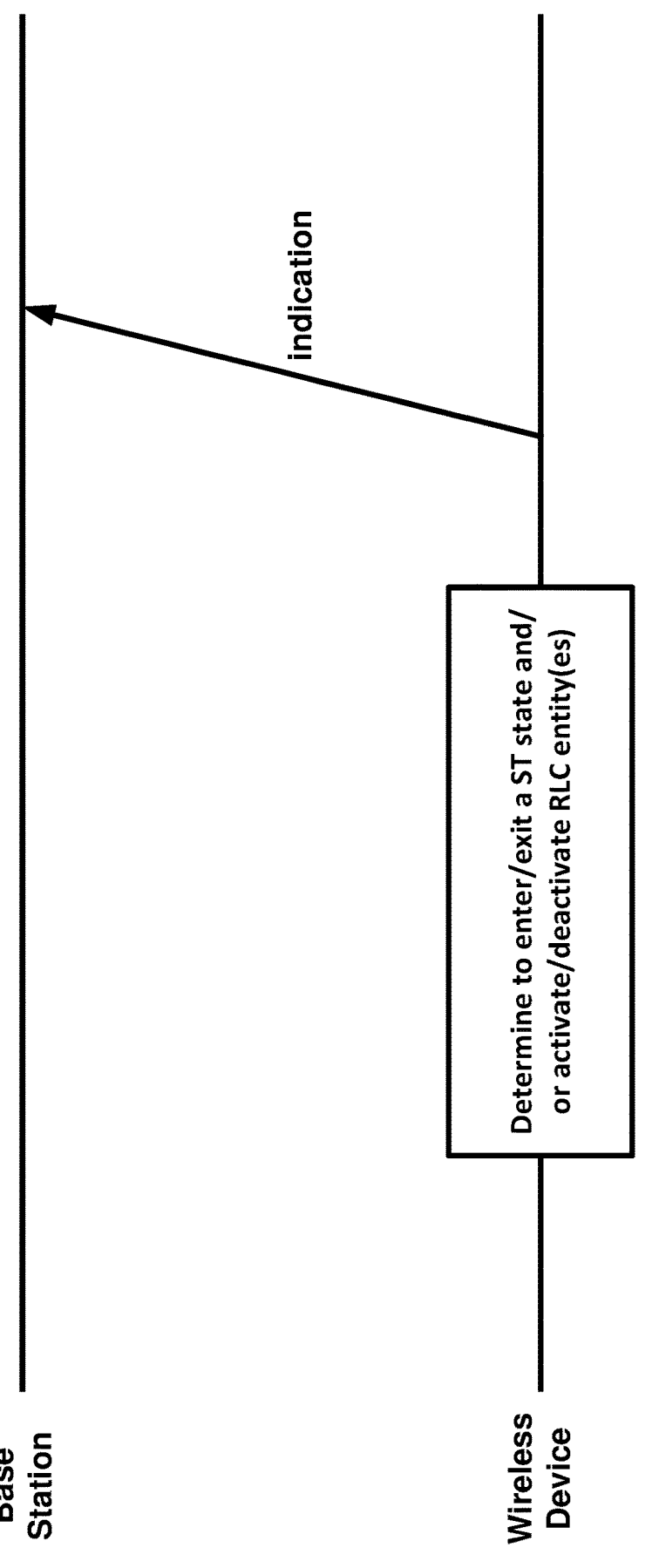
FIG. 29 shows an example process in accordance with several of various embodiments of the present disclosure.

In example embodiments as shown in FIG. 29, in response to a determination to enter a ST state for the first RB/activate the one or more first RLC entities or in response to the determination to exit the ST state for the first RB/de-activate the one or more first RLC entities, the wireless device may transmit an indication of the entry to/exit from the ST state for the first RB and/or activation/deactivation of the one or more first RLC entities to the base station. In an example, the indication of entry/exit to/from the ST state for the first RB and/or activation/deactivation of the one or more first RLC entities may be based on a MAC CE. An LCID associated with the MAC CE may be for indication of entry/exit to the ST state. In an example, the MAC CE may have a zero payload. In an example, the MAC CE may comprise a field with a value indicating the first RB or an identifier of the first RB. In an example, the indication of entry/exit to/from the ST state for the first RB and/or activation/deactivation of the one or more first RLC entities may be based on uplink control information (e.g., HARQ feedback, e.g., a positive ACK).

Figure 30:
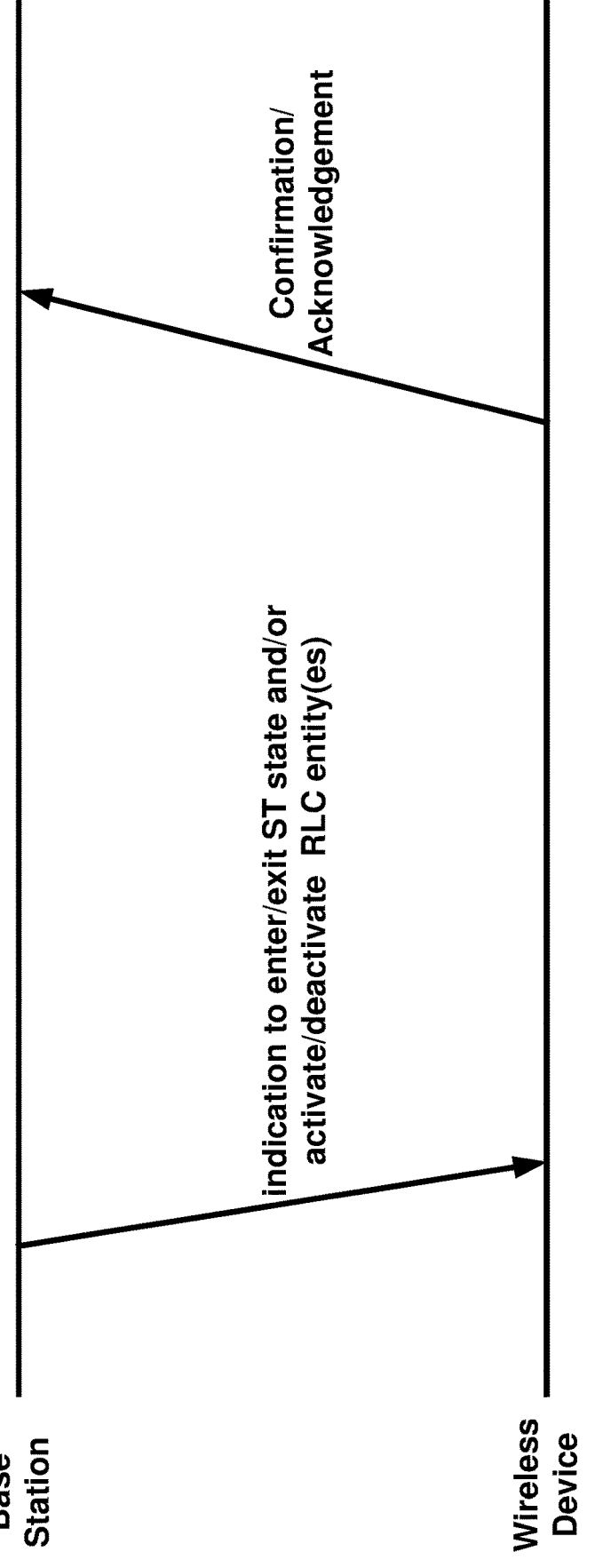
FIG. 30 shows an example process in accordance with several of various embodiments of the present disclosure.

In an example embodiment as shown in FIG. 30, in response to receiving an indication to enter a ST state for the first RB/activate the one or more first RLC entities or exit the ST state for the first RB/deactivate the one or more first RLC entities, the wireless device may transmit a confirmation/ acknowledgement of the entry to/exit from the ST state for the first RB and/or activation/deactivation of the one or more first RLC entities to the base station. In an example, the confirmation/acknowledgement may be based on a MAC CE. An LCID associated with the MAC CE may be for indication of entry/exit to the ST state. In an example, the MAC CE may have a zero payload. In an example, the MAC CE may comprise a field with a value indicating the first RB or an identifier of the first RB. In an example, the indication of entry/exit to/from the ST state for the first RB and/or activation/deactivation of the one or more first RLC entities may be based on uplink control information (e.g., HARQ feedback, e.g., a positive ACK). The wireless device may multiplex the HARQ feedback (e.g., a positive ACK) in a HARQ feedback codebook indicating the reception of the indication of entry/exit to/from the ST state to base station.

In an example embodiment, upon entry into a ST state for a radio bearer, the wireless device may remain in the ST state until receiving an indication to exit the ST state from the base station. In an example, upon entry into a ST state for a radio bearer, the activated RLC entities for PDCP duplica-tion may remain activated until receiving indication from the base station to exit the ST state.

In an example embodiment, upon entry into ST state, the wireless device may indicate (e.g., via a MAC CE, UCI, etc.) to the base station entry to the ST state and/or the selected configuration of RLC entities for PDCP duplication.

In an example embodiment, for PDCP duplication in the ST state, the activated RLC entities may change while in the ST state. The change of the PDCP duplication may be based on comparing a metric with thresholds (e.g., pre-configured or configurable thresholds).

In an example embodiment, a wireless device may receive an indication (e.g., a physical layer indication, e.g., a DCI) indicating that the UE has entered the ST state and/or that there are N HARQ NACKs (e.g., for a HARQ process, e.g., HARQ process of a TB including a bearer configured with survival time).

In an example embodiment, a value of a metric used for entry into the ST state may indicate one of a plurality of configurations of PDCP duplication, e.g., one of a plurality of configuration of RLC entities to be activated for PDCP duplication.

In an example embodiment, a wireless device may deter-mine to enter a survival time (ST) state. The wireless device may activate one or more first radio link control (RLC) entities of a plurality of RLC entities associated with a radio bearer (RB).

In an example embodiment, a wireless device may deter-mine to enter a survival time (ST) state. The wireless device may activate one or more first radio link control (RLC) entities of a plurality of RLC entities associated with a radio bearer (RB) based on one of a plurality of configurations (e.g., a first configuration of the plurality of configurations). Each configuration, of the plurality of configurations, may be associated with a corresponding subset of the plurality of RLC entities.

In an example, the activating the one or more RLC entities may be in response to determining to enter the ST state.

In an example, the determining to enter the ST state may be based on a number of negative acknowledgements (e.g., number of HARQ NACKs and/or number of retransmission grants indicating HARQ NACKs and/or number of a com-bination of HARQ NACKs and retransmission grants indi-cating HARQ NACKs). In an example, the wireless device may determine a first configuration of the plurality of configurations based on the number of acknowledgements, wherein the activating the one or more first RLC entities may be based on the first configuration. In an example, the wireless device may determine a metric based on the number of the negative acknowledgements. In an example, the determining to enter the ST state may be based on compar-ing the number of the negative acknowledgements with a first number. In an example, the determining to enter the ST state may be based on comparing the metric with a first number. In an example, the first number may be pre-configured (e.g., 1, 2, . . . ). In an example, the wireless device may receive a configuration parameter indicating the first number. In an example, the wireless device may deter-mine a first configuration of the plurality of configurations based on the metric, wherein the activating the one or more first RLC entities may be based on the first configuration.

In an example embodiment, a wireless device may receive an indication to enter a survival time (ST) state. The wireless device may activate one or more first radio link control (RLC) entities of a plurality of RLC entities associated with a radio bearer (RB).

In an example embodiment, a wireless device may receive an indication to enter a survival time (ST) state. The wireless device may activate one or more first radio link control (RLC) entities of a plurality of RLC entities associated with a radio bearer (RB) based on one of a plurality of configurations. Each configuration, of the plurality of configurations, may be associated with a corresponding subset of the plurality of RLC entities.

In an example, the indication may comprise a field indicating a first configuration in the plurality of configurations.

In an example, the indication may be a based on a downlink control information. In an example, the downlink control information may indicate a retransmission grant. In an example, the downlink control information may indicate a configured grant activation. In an example, the downlink control information may comprise a field with a value indicating the RB/an identifier of the RB.

In an example, the activating the one or more RLC entities may be for activation of the PDCP duplication.

In an example, the wireless device may receive the plurality of configurations. In an example, each configuration of the plurality of configurations may be associated with a corresponding subset of RLC entities associated with the RB.

In an example, the wireless device may receive one or more configuration parameters indicating that the RB is associated with a service configured for survival time operation. In an example, the wireless device may receive radio bearer configuration parameters, of a radio bearer, comprising one or more configuration parameters indicating that the radio bearer is associated with a service configured for survival time operation.

In an example, the wireless device may transmit an acknowledgement/confirmation in response to the receiving the indication and/or activating the one or more RLC entities. In an example, the wireless device may transmit an indication of entering to the ST state or an indication of activation the one or more RLC entities in response to determining to enter the ST state and/or in response to activation of the one or more RLC entities. In an example, the acknowledgement/confirmation/indication of entering the ST state may be based on a confirmation MAC CE. In an example, the confirmation MAC CE may be associated with an LCID for ST entry. In an example, the MAC CE may have zero payload. In an example, the MAC CE may comprise a field indicating an identifier of the RB. In an example, the MAC CE may comprise a field with a value indicating a HARQ process number. In an example, the HARQ process number may be associated with a transport block comprising a radio bearer associated with a service configured with survival time operation. In an example, the acknowledgement/confirmation/indication of entering the ST state may be based on uplink control information (e.g., positive acknowledgement).

In an example embodiment, a wireless device may determine to exit a survival time (ST) state. The wireless device may deactivate one or more first radio link control (RLC) entities of a plurality of RLC entities associated with a radio bearer (RB) and/or may deactivate a PDCP duplication configuration (e.g., a PDCP duplication configuration activated in response to entering the ST state) for the RB in response to the determining to exit the ST state.

In an example, the deactivating the one or more RLC entities and/or the deactivating the PDCP duplication configuration may be in response to determining to exit the ST state.

In an example, the determining to exit the ST state may be based on a number of negative acknowledgements (e.g., number of HARQ NACKs and/or number of retransmission grants indicating HARQ NACKs and/or number of a combination of HARQ NACKs and retransmission grants indicating HARQ NACKs). In an example, the wireless device may determine a metric based on the number of negative acknowledgements. In an example, the determining to exit the ST state may be based on comparing the number of the negative acknowledgements with a first number. In an example, the determining to exit the ST state may be based on comparing the metric with a first number. In an example, the first number may be preconfigured (e.g., 0, 1, . . . ). In an example, the wireless device may receive a configuration parameter indicating the first number. In an example, the first number for determining to exit the ST state may be different from a second number used for determining to enter the ST state.

In an example, the determining to exit the ST state may be based on a number of positive acknowledgements. In an example, the wireless device may determine to exit the ST state based on a number of positive acknowledgements. In an example, the wireless device may determine a metric based on the number of the positive acknowledgements. In an example, the determining to exit the ST state may be based on comparing the number of the positive acknowledgements with a first number. In an example, the determining to exit the ST state may be based on comparing the metric with a first number. In an example, the first number may be preconfigured (e.g., 0, 1, . . . ). In an example, the first number for determining to exit the ST state may be different from a second number used for determining to enter the ST state. In an example, the wireless device may receive a configuration parameter indicating the first number.

In an example, the determining to exit the ST state may be based on expiry of a ST timer. In an example, the wireless device may start the ST Timer in response to entering the ST state.

In an example embodiment, a wireless device may receive an indication to exit a survival time (ST) state. The wireless device may deactivate one or more first radio link control (RLC) entities of a plurality of RLC entities associated with a radio bearer (RB) and/or may deactivate a PDCP duplication configuration (e.g., a PDCP duplication configuration activated in response to entering the ST state) for the RB in response to the determining to exit the ST state.

In an example, the deactivating the one or more RLC entities and/or the deactivating the PDCP duplication configuration may be in response to receiving the indication.

In an example, the indication may be based on a downlink control information.

In an example, the indication may be based on a MAC CE.

A wireless device may enter a survival time state to prevent consecutive failure of transmission of data/messages corresponding to one or more applications. Existing wireless device and wireless network processes and/or signaling may result in degraded wireless device and wireless network performance when certain applications used by the wireless device are configured with survival time state operation. There is a need to enhance the existing wireless device and wireless network processes and/or signaling when certain applications used by the wireless device are configured with survival time state operation. Example embodiments enhance the existing wireless device and wireless network processes and/or signaling when certain applications used by the wireless device are configured with survival time state operation.

Figure 31:
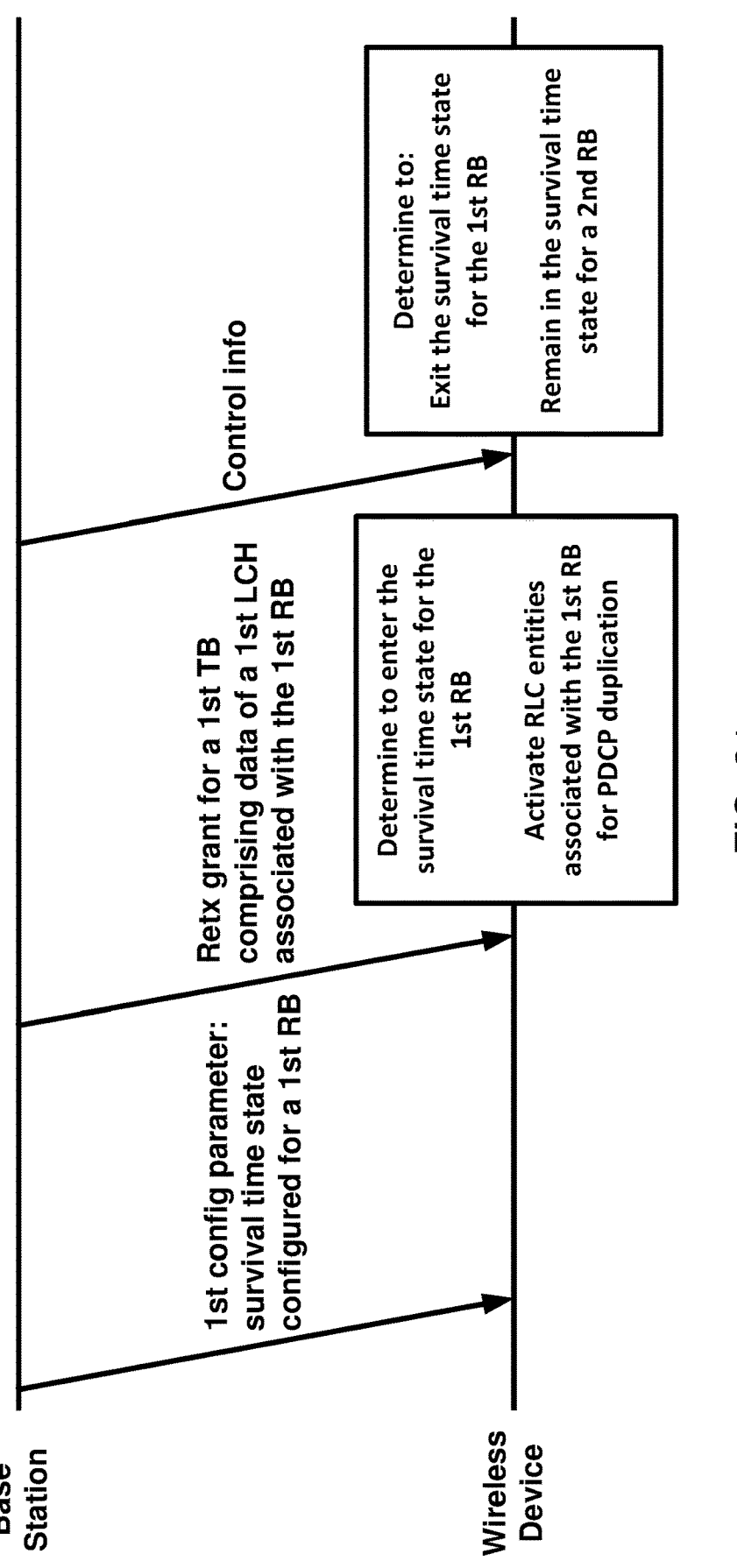
FIG. 31 shows an example process in accordance with several of various embodiments of the present disclosure.

In an example embodiment as shown in FIG. 31, a wireless device may receive one or more messages (e.g., one or more RRC messages) comprising configuration parameters (e.g., RRC configuration parameters). The wireless device may receive the one or more messages from a base station. The one or more configuration parameters may comprise a first configuration parameter indicating that a survival time state is configured/supported for a first radio bearer. For example, the configuration parameters may comprise PDCP configuration parameters for the first radio bearer to configure PDCP parameters for the first radio bearer and the PDCP configuration parameters may comprise the first configuration parameter indicating that the survival time state is configured/supported for the first radio bearer. In an example, the configuration parameters may comprise RLC configuration parameters of a plurality of RLC entities associated with the first radio bearer. In an example, the configuration parameters (e.g., the PDCP configuration parameters) may comprise a PDCP duplication parameter indicating that the PDCP duplication is configured/supported for the first radio bearer.

The wireless device may transmit a first transport block comprising one or more logical channels comprising a first logical channel that is associated with the first radio bearer. In an example, the wireless device may transmit the first transport block based on a configured grant resource. For example, the wireless device may transmit the first transport block based on the configured grant resource in response to/based on the first logical channel being mapped to/allowed to be transmitted via the configured grant resource (e.g., being mapped to a configured grant configuration to which the configured grant resource is associated).

In response to transmission of the first transport block, the wireless device may receive a retransmission grant for retransmission of the first transport block. For example, the retransmission grant may be a DCI associated with a configured scheduling RNTI (CS-RNTI) and with NDI=1. The reception of the retransmission grant may indicate that the initial transmission of the first transport block was unsuccessful and was not successfully received by the base station.

In response to reception of the retransmission grant, the wireless device may determine to enter the survival time state. The wireless device may determine to enter the survival time state based on the first transport block comprising data of a logical channel associated with a radio bearer that is configured with/supports survival time state. The wireless device may (e.g., in response to the determination to enter the survival time state) activate the plurality of RLC entities associated with the first radio bear. The wireless device may transmit a PDCP packet associated with the first radio bearer via the plurality of the RLC entities in response to the plurality of RLC entities being activated (e.g., in response to entering the survival time state for the first radio bearer). In an example, a first RLC entity, of the plurality of RLC entities, may be associated with a first cell/carrier and a second RLC entity, of the plurality of RLC entities, may be associated with a second cell/carrier. The PDCP packet may be multiplexed in a transport block and transmitted via the first cell/carrier (associated with the first RLC entity) and via a second cell/carrier (associated with the second RLC entity).

The wireless device may receive control information indicating exiting the survival time state. The control information may be via physical layer signaling (e.g., DCI, e.g., a DCI indicating an implicit positive acknowledgement) and/or via MAC layer signaling (e.g., a MAC CE). The control information for exiting the survival time state may be radio bearer specific. For example, the control information (e.g., a MAC CE) may comprise one or more fields indicating from which radio bearer(s) the wireless device is to exit the survival time state in response to reception of the control information. For example, the control information may be based on one or more positive acknowledgements (or not receiving a negative acknowledgement or a DCI indicating implicit positive acknowledgement) for one or more transport block comprising data of a logical channel corresponding to a radio bearer that is in the survival time state. For example, in addition to the first radio bearer, the wireless device may be in the survival time state for a second radio bearer. The control information may indicate (e.g., based on one or more fields of the control information, e.g., one or more fields of a MAC CE) exiting the survival time state for the first radio bearer and may indicate remaining in the survival time state for the second radio bearer. In response to receiving the control information, the wireless device may exit/determine to exit the survival time state for the first radio bearer and may remain/determine to remain in the survival time state for the second radio bearer. The wireless device may deactivate at least one RLC entity of the pluralities of RLC entities associated with the first radio bearer in response to exiting/determining to exit the survival time state for the first radio bearer.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

FIG. 32 shows an example flow diagram in accordance with several of various embodiments of the present disclosure. At 3210, a wireless device may receive, from a base station, a first configuration parameter indicating that a survival time state is configured for a first radio bearer. At 3220, in response to receiving a retransmission grant for a first transport block comprising data of a first logical channel associated with the first radio bearer: the wireless device may determine to enter a survival time state for the first radio bearer; and activate a plurality of radio link control (RLC) entities associated with the first radio bearer for packet data convergence protocol (PDCP) duplication based on the determination to enter the survival time state for the first radio bearer. At 3230, the wireless device may determine, in response to receiving control information from the base station, to: exit from the survival time state for the first radio bearer; and remain in the survival time state for a second radio bearer.

In an example embodiment, the control information may be based on a medium access control (MAC) control element (CE).

In an example embodiment, the control information may comprise at least one positive acknowledgement and/or indication of successful reception associated with a second transport block comprising data of the first logical channel.

In an example embodiment, the wireless device may receive second configuration parameters of the plurality of the RLC entities associated with the radio bearer.

In an example embodiment, the wireless device may receive a third configuration parameter indicating that the PDCP duplication is configured for the first radio bearer.

In an example embodiment, the wireless device may deactivate at least one RLC entity of the plurality of RLC entities in response to the determining to exit from the survival time state for the first radio bearer at 3230.

In an example embodiment, the wireless device may be in the survival time state for the second radio bearer prior to receiving the control information.

In an example embodiment, the wireless device may transmit data associated with the first radio bearer based on the PDCP duplication and the activated plurality of RLC entities. In an example, the transmitting may be via a plurality of cells.

In an example embodiment, the wireless device may transmit the first transport block based on a configured grant resource.

In an example embodiment, a TRUE value of the first configuration parameter, received at 3210, may indicate that the survival time state is configured for first radio bearer.

FIG. 33 shows an example flow diagram in accordance with several of various embodiments of the present disclosure. At 3310, a wireless device may receive a configuration parameter indicating that a survival time state is configured for a first radio bearer. At 3320, the wireless device may determine to enter a survival time state for the first radio bearer in response to receiving a retransmission grant for a transport block comprising data of a logical channel associated with the first radio bearer. At 3330, the wireless device may determine, in response to receiving control information, to: exit from the survival time state for the first radio bearer; and remain in the survival time state for a second radio bearer.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least"

indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:

receiving, by a wireless device from a base station:
  a first configuration parameter indicating that a survival time state is configured for a first radio bearer;
  a first packet data convergence protocol (PDCP) duplication configuration that is applicable while the first radio bearer is in the survival time state; and
  a second PDCP duplication configuration that is applicable while the first radio bearer is outside the survival time state;

determining, in response to receiving a retransmission grant for a first transport block comprising data of a first logical channel associated with the first radio bearer, to enter a survival time state for the first radio bearer and use the first PDCP duplication configuration;

determining, by the wireless device and in response to receiving control information from the base station, to:
  exit from the survival time state for the first radio bearer and use the second PDCP duplication configuration; and
  remain in the survival time state for a second radio bearer; and transmitting an acknowledgement of the exit from the survival state for the first radio bearer.

2. The method of claim 1, wherein the control information is based on a medium access control (MAC) control element (CE).

3. The method of claim 1, further comprising receiving second configuration parameters of the plurality of the RLC entities associated with the radio bearer.

4. The method of claim 1, further comprising receiving a third configuration parameter indicating that the PDCP duplication is configured for the first radio bearer.

5. The method of claim 1, further comprising deactivating at least one RLC entity of the plurality of RLC entities in response to the determining to exit from the survival time state for the first radio bearer.

6. The method of claim 1, wherein the wireless device is in the survival time state for the second radio bearer prior to receiving the control information.

7. The method of claim 1, further comprising transmitting data associated with the first radio bearer based on the applicable PDCP duplication configuration.

8. The method of claim 7, wherein the transmitting is via a plurality of cells.

9. The method of claim 1, further comprising transmitting the first transport block based on a configured grant resource.

10. The method of claim 1, wherein a TRUE value of the first configuration parameter indicates that the survival time state is configured for first radio bearer.

11. The method of claim 1, wherein the instructions, when executed by the one or more processors, further cause the wireless device to transmit the first transport block based on a configured grant resource.

12. A wireless device comprising:

one or more processors; and memory storing instructions that, when executed by the one or more processors, cause the wireless device to:
  receive, from a base station:
    a first configuration parameter indicating that a survival time state is configured for a first radio bearer;
    a first packet data convergence protocol (PDCP) duplication configuration that is applicable while the first radio bearer is in the survival time state; and
    a second PDCP duplication configuration that is applicable while the first radio bearer is outside the survival time state;
  determine, in response to receiving a retransmission grant for a first transport block comprising data of a first logical channel associated with the first radio bearer, to enter a survival time state for the first radio bearer and use the first PDCP duplication configuration; and
  determine, in response to receiving control information from the base station, to:
    exit from the survival time state for the first radio bearer and use the second PDCP duplication configuration;
    remain in the survival time state for a second radio bearer; and
  transmit an acknowledgement of the exit from the survival state for the first radio bearer.

13. The wireless device of claim 12, wherein the control information is based on a medium access control (MAC) control element (CE).

14. The wireless device of claim 12, wherein the instructions, when executed by the one or more processors, further cause the wireless device to receive second configuration parameters of the plurality of the RLC entities associated with the radio bearer.

15. The wireless device of claim 12, wherein the instructions, when executed by the one or more processors, further cause the wireless device to receive a third configuration parameter indicating that the PDCP duplication is configured for the first radio bearer.

16. The wireless device of claim 12, wherein the instructions, when executed by the one or more processors, further cause the wireless device to deactivate at least one RLC entity of the plurality of RLC entities in response to the determining to exit from the survival time state for the first radio bearer.

17. The wireless device of claim 12, wherein the wireless device is in the survival time state for the second radio bearer prior to receiving the control information.

18. The wireless device of claim 12, wherein the instructions, when executed by the one or more processors, further cause the wireless device to transmit data associated with the first radio bearer based on the applicable PDCP duplication configuration.

19. The wireless device of claim 18, wherein the transmitting is via a plurality of cells.

20. A system comprising:

a base station; and a wireless device comprising: one or more processors; and
memory storing instructions that, when executed by the one or more processors, cause the wireless device to: receive, from the base station: a first configuration parameter indicating that a survival time state is configured for a first radio bearer; a first packet data convergence protocol (PDCP) duplication configuration that is applicable while the first radio bearer is in the survival time state; and a second PDCP duplication configuration that is applicable while the first radio bearer is outside the survival time state; determine, in response to receiving a retransmission grant for a first transport block comprising data of a first logical channel associated with the first radio bearer, to enter a survival time state for the first radio bearer and use the first PDCP duplication configuration;

determine, in response to receiving control information from the base station, to: exit from the survival time state for the first radio bearer and use the second PDCP duplication configuration; and remain in the survival time state for a second radio bearer; and transmit an acknowledgement of the exit from the survival state for the first radio bearer.

* * * * *